US011044351B2

(12) United States Patent
Li et al.

(10) Patent No.: US 11,044,351 B2
(45) Date of Patent: Jun. 22, 2021

(54) SECURE SOUNDING SIGNALS

(71) Applicant: Intel IP Corporation, Santa Clara, CA (US)

(72) Inventors: Qinghua Li, San Ramon, CA (US); Feng Jiang, Santa Clara, CA (US); Assaf Gurevitz, Ramat Hasharon (IL); Robert J. Stacey, Portland, OR (US); Huaning Niu, Milpitas, CA (US); Yuan Zhu, Beijing (CN); Jonathan Segev, Sunnyvale, CA (US)

(73) Assignee: Intel IP Corporation, Santa Clara, CA (US)

( * ) Notice: Subject to any disclaimer, the term of this patent is extended or adjusted under 35 U.S.C. 154(b) by 269 days.

(21) Appl. No.: 16/216,417

(22) Filed: Dec. 11, 2018

(65) Prior Publication Data

US 2019/0182365 A1 Jun. 13, 2019

Related U.S. Application Data

(60) Provisional application No. 62/597,254, filed on Dec. 11, 2017, provisional application No. 62/629,970, filed on Feb. 13, 2018.

(51) Int. Cl.
*H04L 29/06* (2006.01)
*H04W 72/04* (2009.01)
(Continued)

(52) U.S. Cl.
CPC .............. *H04L 69/18* (2013.01); *H04L 5/001* (2013.01); *H04L 27/2075* (2013.01);
(Continued)

(58) Field of Classification Search
CPC ..... H04L 69/18; H04L 5/001; H04L 27/2075; H04L 63/061; H04L 63/083;
(Continued)

(56) References Cited

U.S. PATENT DOCUMENTS

2014/0079048 A1* 3/2014 Van Nee .............. H04B 7/0671
370/338
2016/0056991 A1* 2/2016 Zhang ................. H04L 27/2602
375/260
(Continued)

OTHER PUBLICATIONS

Rahbari, Hanif et al. "Exploiting Frame Preamble Waveforms to Support New Physical-Layer Functions in OFDM-based 802.11 Systems" [online] IEEE, Jun. 6, 2017 [retrieved Oct. 30, 2020], Retrieved from the Internet: URL: https://ieeexplore.ieee.org/stamp/stamp.jsp?tp=&arnumber=7888574&tag=1 (Year: 2017).*
(Continued)

*Primary Examiner* — Taghi T Arani
*Assistant Examiner* — Joshua Raymond White
(74) *Attorney, Agent, or Firm* — Schwegman Lundberg & Woessner, P.A.

(57) ABSTRACT

Methods, apparatuses, and computer readable media for location measurement reporting in a wireless network are disclosed. An apparatus of a responder station is disclosed, the apparatus comprising processing circuitry configured to derive bits from a temporary key, and generate a first sequence and a second sequence using the bits, wherein the first sequence and second sequence comprise one or more symbols. The processing circuitry is further configured to concatenate the first sequence and the second sequence to form a new first sequence comprising the first sequence and the second sequence, and concatenate a modified first sequence and a modified second sequence to form a new second sequence. The processing circuitry may be configured to repeat a number of times the concatenate the first sequence through the concatenate the modified first sequence.

20 Claims, 16 Drawing Sheets

(51) Int. Cl.
    *H04L 27/20*     (2006.01)
    *H04L 5/00*     (2006.01)
    *H04W 12/04*     (2021.01)
    *H04W 12/06*     (2021.01)
    *H04W 84/12*     (2009.01)

(52) U.S. Cl.
    CPC .......... *H04L 63/061* (2013.01); *H04L 63/083* (2013.01); *H04W 12/04* (2013.01); *H04W 12/06* (2013.01); *H04W 72/0453* (2013.01); *H04L 2463/061* (2013.01); *H04W 84/12* (2013.01)

(58) Field of Classification Search
    CPC   H04L 2463/061; H04W 12/04; H04W 12/06; H04W 72/0453; H04W 84/12
    See application file for complete search history.

(56) References Cited

U.S. PATENT DOCUMENTS

2016/0380729 A1* 12/2016 Porat ................... H04B 7/0617
                                                      370/329
2017/0324598 A1* 11/2017 Suh ..................... H04L 27/2603
2017/0373808 A1* 12/2017 Park ....................... H04L 5/005

OTHER PUBLICATIONS

Rahbari, Hanif et al. "Exploiting Frame Preamble Waveforms to Support New Physical-Layer Functions in OFDM-based 802.11 Systems" [online] IEEE, Jun. 6, 2017 [retrieved Feb. 9, 2021], Retrieved from the Internet: URL: https://ieeexplore.ieee.org/stamp/stamp.jsp?tp=&arnumber=7888574&tag=1 (Year: 2017).*

* cited by examiner

US 11,044,351 B2

SECURE SOUNDING SIGNALS

PRIORITY CLAIM

This application claims the benefit of priority under 35 USC 119(e) to U.S. Provisional Patent Application Ser. No. 62/597,254, filed Dec. 11, 2017, and U.S. Provisional Patent Application Ser. No. 62/629,970, filed Feb. 13, 2018, both of which are incorporated herein by reference in their entirety.

TECHNICAL FIELD

Embodiments pertain to wireless networks and wireless communications. Some embodiments relate to wireless local area networks (WLANs) and Wi-Fi networks including networks operating in accordance with the IEEE 802.11 family of standards. Some embodiments relate to IEEE 802.11 az, IEEE 802.11ax, and/or IEEE 802.11 extremely high-throughput (EHT). Some embodiments relate to generating sounding signals for secure ranging and location measurement reporting (LMR).

BACKGROUND

Efficient use of the resources of a wireless local-area network (WLAN) is important to provide bandwidth and acceptable response times to the users of the WLAN. However, often there are many devices trying to share the same resources and some devices may be limited by the communication protocol they use or by their hardware bandwidth. Moreover, wireless devices may need to operate with both newer protocols and with legacy device protocols and may need to operate in a secure mode.

BRIEF DESCRIPTION OF THE DRAWINGS

The present disclosure is illustrated by way of example and not limitation in the figures of the accompanying drawings, in which like references indicate similar elements and in which.

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Some embodiments relate to methods, computer readable media, and apparatus for ordering or scheduling location measurement reports, traffic indication maps (TIMs), and other information during SPs. Some embodiments relate to methods, computer readable media, and apparatus for extending TIMs. Some embodiments relate to methods, computer readable media, and apparatus for defining SPs during beacon intervals (BI), which may be based on TWTs.

Figure 1:
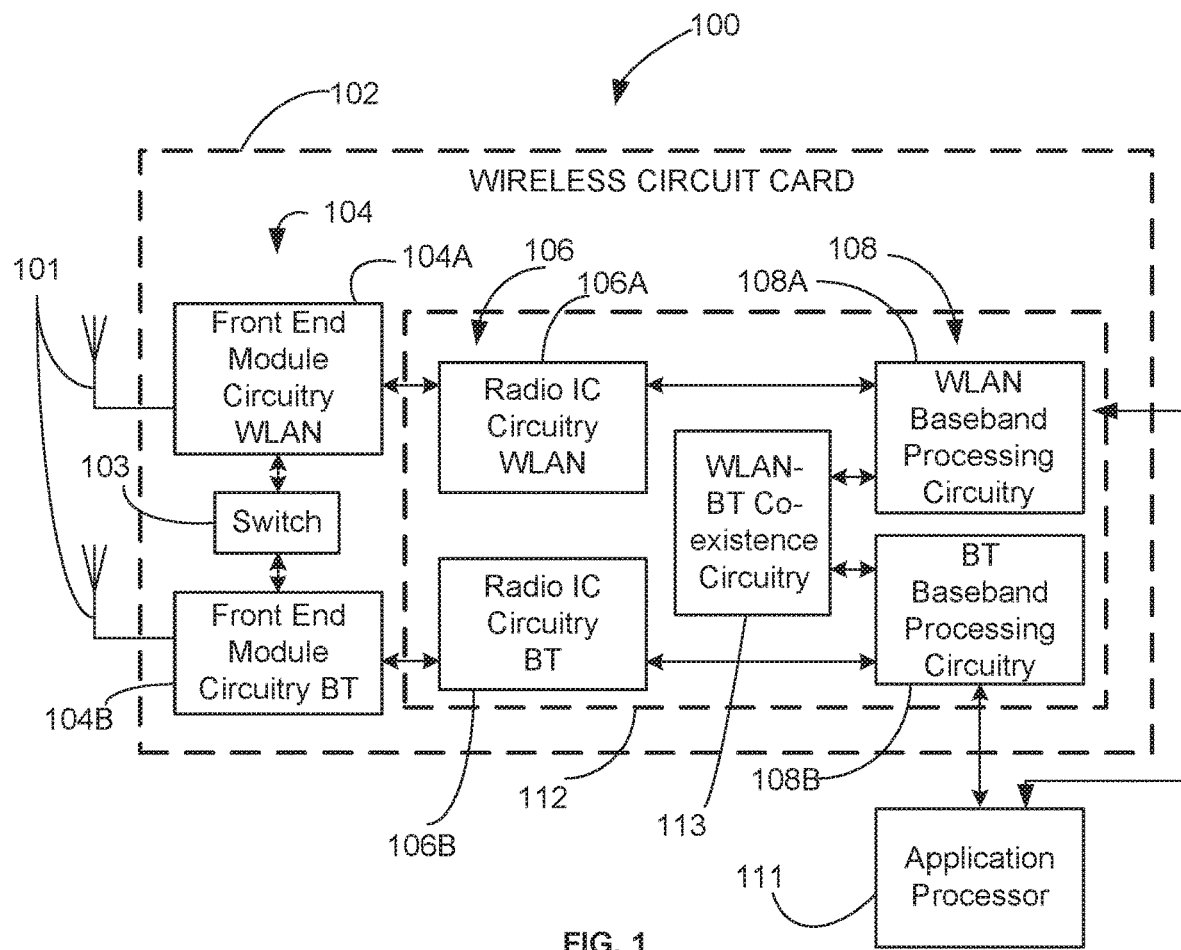
FIG. 1 is a block diagram of a radio architecture in accordance with some embodiments.

FIG. 1 is a block diagram of a radio architecture 100 in accordance with some embodiments. Radio architecture 100 may include radio front-end module (FEM) circuitry 104, radio IC circuitry 106 and baseband processing circuitry 108. Radio architecture 100 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 104 may include a WLAN or Wi-Fi FEM circuitry 104A and a Bluetooth (BT) FEM circuitry 104B. The WLAN FEM circuitry 104A may include a receive signal path comprising circuitry configured to operate on WLAN RF signals received from one or more antennas 101, to amplify the received signals and to provide the amplified versions of the received signals to the WLAN radio IC circuitry 106A for further processing. The BT FEM circuitry 104B may include a receive signal path which may include circuitry configured to operate on BT RF signals received from one or more antennas 101, to amplify the received signals and to provide the amplified versions of the received signals to the BT radio IC circuitry 106B for further processing. FEM circuitry 104A may also include a transmit signal path which may include circuitry configured to amplify WLAN signals provided by the radio IC circuitry 106A for wireless transmission by one or more of the antennas 101. In addition, FEM circuitry 104B may also include a transmit signal path which may include circuitry configured to amplify BT signals provided by the radio IC circuitry 106B for wireless transmission by the one or more antennas. In the embodiment of FIG. 1, although FEM 104A and FEM 104B are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 106 as shown may include WLAN radio IC circuitry 106A and BT radio IC circuitry 106B. The WLAN radio IC circuitry 106A may include a receive signal path which may include circuitry to down-convert WLAN RF signals received from the FEM circuitry 104A and provide baseband signals to WLAN baseband processing circuitry 108A. BT radio IC circuitry 106B may in turn include a receive signal path which may include circuitry to down-convert BT RF signals received from the FEM circuitry 104B and provide baseband signals to BT baseband processing circuitry 108B. WLAN radio IC circuitry 106A may also include a transmit signal path which may include circuitry to up-convert WLAN baseband signals provided by the WLAN baseband processing circuitry 108A and provide WLAN RF output signals to the FEM circuitry 104A for subsequent wireless transmission by the one or more antennas 101. BT radio IC circuitry 106B may also include a transmit signal path which may include circuitry to up-convert BT baseband signals provided by the BT baseband processing circuitry 108B and provide BT RF output signals to the FEM circuitry 104B for subsequent wireless transmission by the one or more antennas 101. In the embodiment of FIG. 1, although radio IC circuitries 106A and 106B are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuity 108 may include a WLAN baseband processing circuitry 108A and a BT baseband processing circuitry 108B. The WLAN baseband processing circuitry 108A may include a memory, such as, for example, a set of RAM arrays in a Fast Fourier Transform or Inverse Fast Fourier Transform block (not shown) of the WLAN baseband processing circuitry 108A. Each of the WLAN baseband circuitry 108A and the BT baseband circuitry 108B may further include one or more processors and control logic to process the signals received from the corresponding WLAN or BT receive signal path of the radio IC circuitry 106, and to also generate corresponding WLAN or BT baseband signals for the transmit signal path of the radio IC circuitry 106. Each of the baseband processing circuitries 108A and 108B may further include physical layer (PHY) and medium access control layer (MAC) circuitry, and may further interface with application processor 111 for generation and processing of the baseband signals and for controlling operations of the radio IC circuitry 106.

Referring still to FIG. 1, according to the shown embodiment, WLAN-BT coexistence circuitry 113 may include logic providing an interface between the WLAN baseband circuitry 108A and the BT baseband circuitry 108B to enable use cases requiring WLAN and BT coexistence. In addition, a switch 103 may be provided between the WLAN FEM circuitry 104A and the BT FEM circuitry 104B to allow switching between the WLAN and BT radios according to application needs. In addition, although the antennas 101 are depicted as being respectively connected to the WLAN FEM circuitry 104A and the BT FEM circuitry 104B, embodiments include within their scope the sharing of one or more antennas as between the WLAN and BT FEMs, or the provision of more than one antenna connected to each of FEM 104A or 104B.

In some embodiments, the front-end module circuitry 104, the radio IC circuitry 106, and baseband processing circuitry 108 may be provided on a single radio card, such as wireless radio card 102. In some other embodiments, the one or more antennas 101, the FEM circuitry 104 and the radio IC circuitry 106 may be provided on a single radio card. In some other embodiments, the radio IC circuitry 106 and the baseband processing circuitry 108 may be provided on a single chip or IC, such as IC 112.

In some embodiments, the wireless radio card 102 may include a WLAN radio card and may be configured for Wi-Fi communications, although the scope of the embodiments is not limited in this respect. In some of these embodiments, the radio architecture 100 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 100 may be part of a Wi-Fi communication station (STA) such as a wireless access point (AP), a base station or a mobile device including a Wi-Fi device. In some of these embodiments, radio architecture 100 may be configured to transmit and receive signals in accordance with specific communication standards and/or protocols, such as any of the Institute of Electrical and Electronics Engineers (IEEE) standards including, IEEE 802.11n-2009, IEEE 802.11-2012, IEEE 802.11-2016, IEEE 802.11 ac, and/or IEEE 802.11ax standards and/or proposed specifications for WLANs, although the scope of embodiments is not limited in this respect. Radio architecture 100 may also be suitable to transmit and/or receive communications in accordance with other techniques and standards.

In some embodiments, the radio architecture 100 may be configured for high-efficiency (HE) Wi-Fi (HEW) communications in accordance with the IEEE 802.11ax standard. In these embodiments, the radio architecture 100 may be configured to communicate in accordance with an OFDMA technique, although the scope of the embodiments is not limited in this respect.

In some other embodiments, the radio architecture 100 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 1, the BT baseband circuitry 108B may be compliant with a Bluetooth (BT) connectivity standard such as Bluetooth, Bluetooth 4.0 or Bluetooth 5.0, or any other iteration of the Bluetooth Standard. In embodiments that include BT functionality as shown for example in FIG. 1, the radio architecture 100 may be configured to establish a BT synchronous connection oriented (SCO) link and/or a BT low energy (BT LE) link. In some of the embodiments that include functionality, the radio architecture 100 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 1, the functions of a BT radio card and WLAN radio card may be combined on a single wireless radio card, such as single wireless radio card 102, although embodiments are not so limited, and include within their scope discrete WLAN and BT radio cards In some embodiments, the radio-architecture 100 may include other radio cards, such as a cellular radio card configured for cellular (e.g., 3GPP such as LTE, LTE-Advanced or 5G communications).

In some IEEE 802.11 embodiments, the radio architecture 100 may be configured for communication over various channel bandwidths including bandwidths having center frequencies of about 900 MHz, 2.4 GHz, 5 GHz, and bandwidths of about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous bandwidths). In some embodiments, a 320 MHz channel bandwidth may be used. The scope of the embodiments is not limited with respect to the above center frequencies however.

Figure 2:
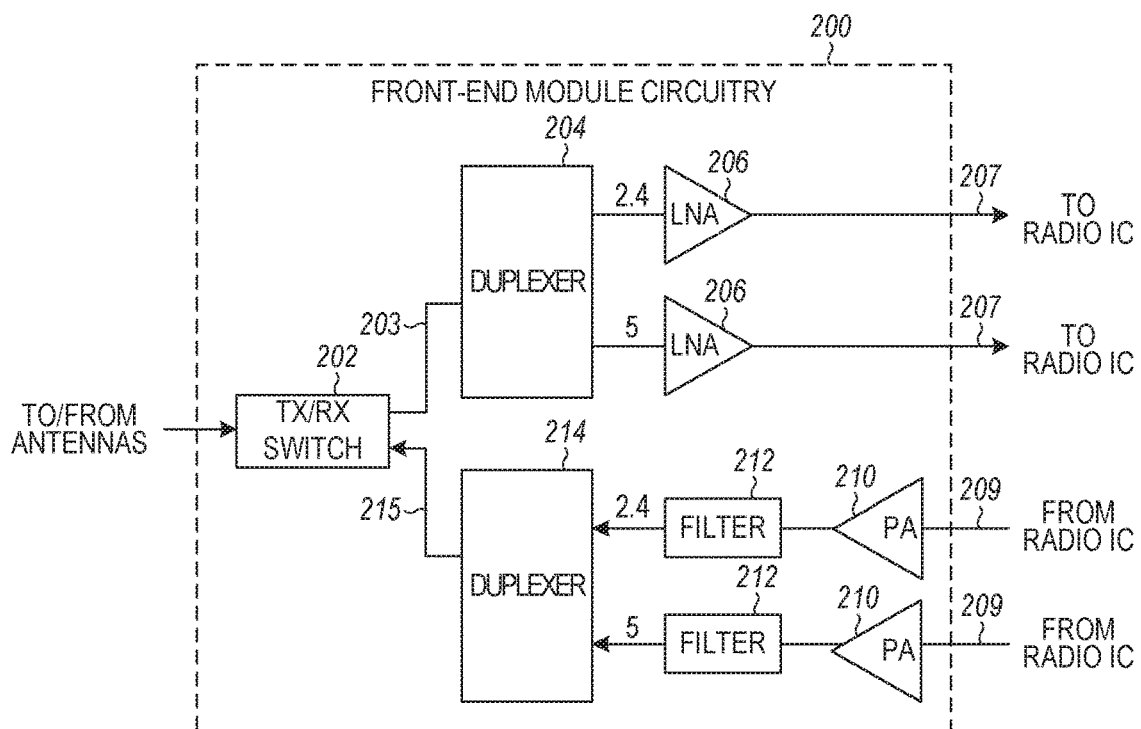
FIG. 2 illustrates a front-end module circuitry for use in the radio architecture of FIG. 1 in accordance with some embodiments.

FIG. 2 illustrates FEM circuitry 200 in accordance with some embodiments. The FEM circuitry 200 is one example of circuitry that may be suitable for use as the WLAN and/or BT FEM circuitry 104A/104B (FIG. 1), although other circuitry configurations may also be suitable.

In some embodiments, the FEM circuitry 200 may include a TX/RX switch 202 to switch between transmit mode and receive mode operation. The FEM circuitry 200 may include a receive signal path and a transmit signal path. The receive signal path of the FEM circuitry 200 may include a low-noise amplifier (LNA) 206 to amplify received RF signals 203 and provide the amplified received RF signals 207 as an output (e.g., to the radio IC circuitry 106 (FIG. 1)). The transmit signal path of the circuitry 200 may include a power amplifier (PA) to amplify input RF signals 209 (e.g., provided by the radio IC circuitry 106), and one or more filters 212, such as band-pass filters (BPFs), low-pass filters (LPFs) or other types of filters, to generate RF signals 215 for subsequent transmission (e.g., by one or more of the antennas 101 (FIG. 1)).

In some dual-mode embodiments for Wi-Fi communication, the FEM circuitry 200 may be configured to operate in either the 2.4 GHz frequency spectrum or the 5 GHz frequency spectrum. In these embodiments, the receive signal path of the FEM circuitry 200 may include a receive signal path duplexer 204 to separate the signals from each spectrum as well as provide a separate LNA 206 for each spectrum as shown. In these embodiments, the transmit signal path of the FEM circuitry 200 may also include a power amplifier 210 and a filter 212, such as a BPF, a LPF or another type of filter for each frequency spectrum and a transmit signal path duplexer 214 to provide the signals of one of the different spectrums onto a single transmit path for subsequent transmission by the one or more of the antennas 101 (FIG. 1). In some embodiments, BT communications may utilize the 2.4 GHZ signal paths and may utilize the same FEM circuitry 200 as the one used for WLAN communications.

Figure 3:
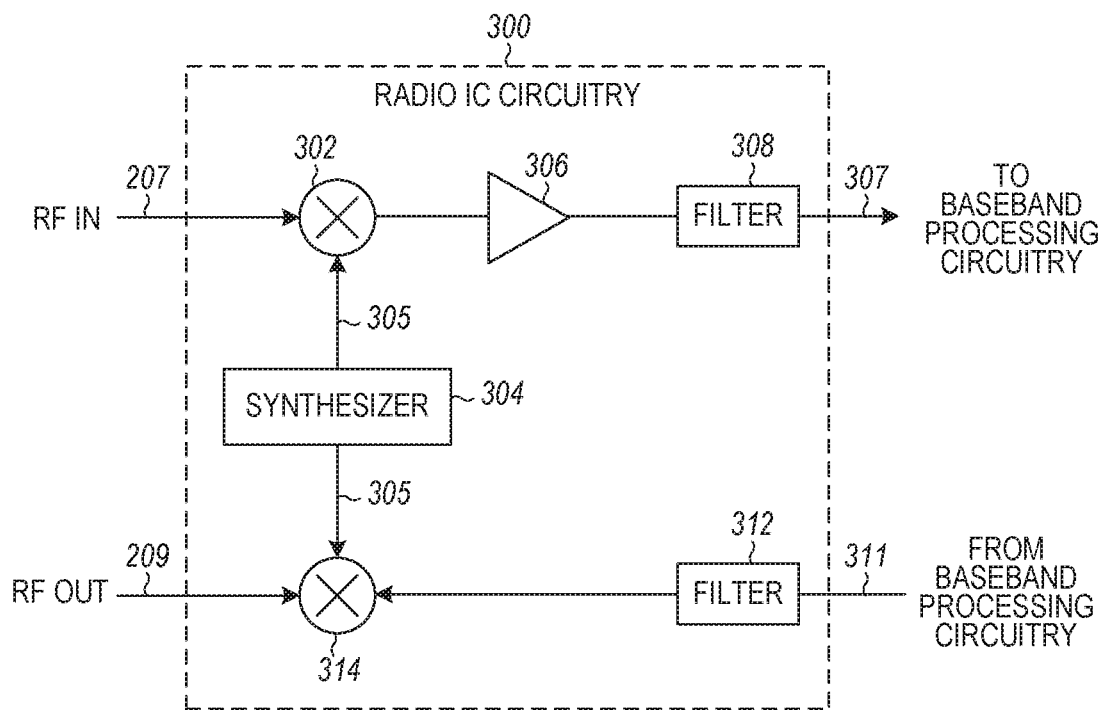
FIG. 3 illustrates a radio IC circuitry for use in the radio architecture of FIG. 1 in accordance with some embodiments.

FIG. 3 illustrates radio integrated circuit (IC) circuitry 300 in accordance with some embodiments. The radio IC circuitry 300 is one example of circuitry that may be suitable for use as the WLAN or BT radio IC circuitry 106A/106B (FIG. 1), although other circuitry configurations may also be suitable.

In some embodiments, the radio IC circuitry 300 may include a receive signal path and a transmit signal path. The receive signal path of the radio IC circuitry 300 may include at least mixer circuitry 302, such as, for example, down-conversion mixer circuitry, amplifier circuitry 306 and filter circuitry 308. The transmit signal path of the radio IC circuitry 300 may include at least filter circuitry 312 and mixer circuitry 314, such as, for example, up-conversion mixer circuitry. Radio IC circuitry 300 may also include synthesizer circuitry 304 for synthesizing a frequency 305 for use by the mixer circuitry 302 and the mixer circuitry 314. The mixer circuitry 302 and/or 314 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 3 illustrates only a simplified version of a radio IC circuitry, and may include, although not shown, embodiments where each of the depicted circuitries may include more than one component. For instance, mixer circuitry 320 and/or 314 may each include one or more mixers, and filter circuitries 308 and/or 312 may each include one or more filters, such as one or more BPFs and/or LPFs according to application needs. For example, when mixer circuitries are of the direct-conversion type, they may each include two or more mixers.

In some embodiments, mixer circuitry 302 may be configured to down-convert RF signals 207 received from the FEM circuitry 104 (FIG. 1) based on the synthesized frequency 305 provided by synthesizer circuitry 304. The amplifier circuitry 306 may be configured to amplify the down-converted signals and the filter circuitry 308 may include a LPF configured to remove unwanted signals from the down-converted signals to generate output baseband signals 307. Output baseband signals 307 may be provided to the baseband processing circuitry 108 (FIG. 1) for further processing. In some embodiments, the output baseband signals 307 may be zero-frequency baseband signals, although this is not a requirement. In some embodiments, mixer circuitry 302 may comprise passive mixers, although the scope of the embodiments is not limited in this respect.

In some embodiments, the mixer circuitry 314 may be configured to up-convert input baseband signals 311 based on the synthesized frequency 305 provided by the synthesizer circuitry 304 to generate RF output signals 209 for the FEM circuitry 104. The baseband signals 311 may be provided by the baseband processing circuitry 108 and may be filtered by filter circuitry 312. The filter circuitry 312 may include a LPF or a BPF, although the scope of the embodiments is not limited in this respect.

In some embodiments, the mixer circuitry 302 and the mixer circuitry 314 may each include two or more mixers and may be arranged for quadrature down-conversion and/or up-conversion respectively with the help of synthesizer 304. In some embodiments, the mixer circuitry 302 and the mixer circuitry 314 may each include two or more mixers each configured for image rejection (e.g., Hartley image rejection). In some embodiments, the mixer circuitry 302 and the mixer circuitry 314 may be arranged for direct down-conversion and/or direct up-conversion, respectively. In some embodiments, the mixer circuitry 302 and the mixer circuitry 314 may be configured for super-heterodyne operation, although this is not a requirement.

Mixer circuitry 302 may comprise, according to one embodiment: quadrature passive mixers (e.g., for the in-phase (I) and quadrature phase (Q) paths). In such an embodiment, RF input signal 207 from FIG. 3 may be down-converted to provide I and Q baseband output signals to be sent to the baseband processor Quadrature passive mixers may be driven by zero and ninety-degree time-varying LO switching signals provided by a quadrature circuitry which may be configured to receive a LO frequency ($f_{LO}$) from a local oscillator or a synthesizer, such as LO frequency 305 of synthesizer 304 (FIG. 3). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have a 25% duty cycle and a 50% offset. In some embodiments, each branch of the mixer circuitry (e.g., the in-phase (I) and quadrature phase (Q) path) may operate at a 25% duty cycle, which may result in a significant reduction is power consumption.

The RF input signal 207 (FIG. 2) may comprise a balanced signal, although the scope of the embodiments is not limited in this respect. The I and Q baseband output signals may be provided to low-nose amplifier, such as amplifier circuitry 306 (FIG. 3) or to filter circuitry 308 (FIG. 3).

In some embodiments, the output baseband signals 307 and the input baseband signals 311 may be analog baseband signals, although the scope of the embodiments is not limited in this respect. In some alternate embodiments, the output baseband signals 307 and the input baseband signals 311 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 304 may be a fractional-N synthesizer or a fractional N/N+1 synthesizer, although the scope of the embodiments is not limited in this respect as other types of frequency synthesizers may be suitable. For example, synthesizer circuitry 304 may be a delta-sigma synthesizer, a frequency multiplier, or a synthesizer comprising a phase-locked loop with a frequency divider. According to some embodiments, the synthesizer circuitry 304 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuity 304 may be provided by a voltage controlled oscillator (VCO), although that is not a requirement. A divider control input may further be provided by either the baseband processing circuitry 108 (FIG. 1) or the application processor 111 (FIG. 1) depending on the desired output frequency 305. In some embodiments, a divider control input (e.g., N) may be determined from a look-up table (e.g., within a Wi-Fi card) based on a channel number and a channel center frequency as determined or indicated by the application processor 111.

In some embodiments, synthesizer circuitry 304 may be configured to generate a carrier frequency as the output frequency 305, while in other embodiments, the output frequency 305 may be a fraction of the carrier frequency (e.g., one-half the carrier frequency, one-third the carrier frequency). In some embodiments, the output frequency 305 may be a LO frequency ($f_{LO}$).

Figure 4:
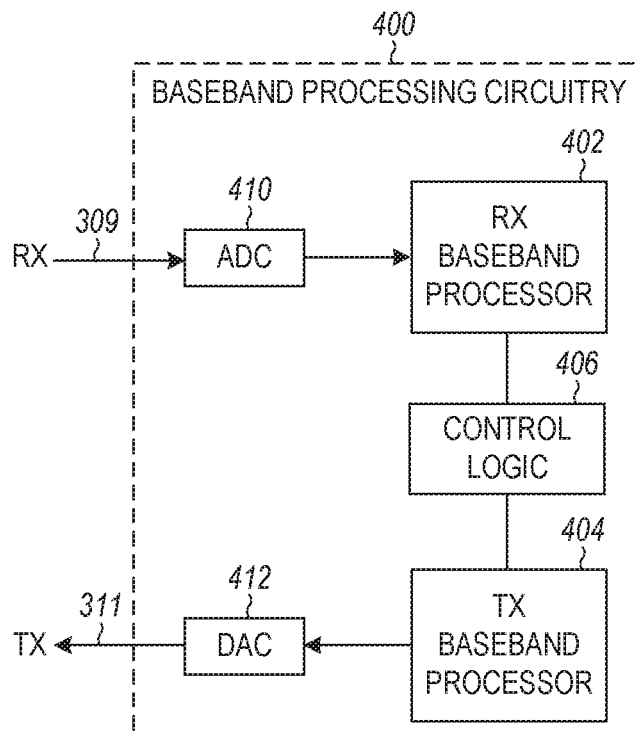
FIG. 4 illustrates a baseband processing circuitry for use in the radio architecture of FIG. 1 in accordance with some embodiments.

FIG. 4 illustrates a functional block diagram of baseband processing circuitry 400 in accordance with some embodiments. The baseband processing circuitry 400 is one example of circuitry that may be suitable for use as the baseband processing circuitry 108 (FIG. 1), although other circuitry configurations may also be suitable. The baseband processing circuitry 400 may include a receive baseband processor (RX BBP) 402 for processing receive baseband signals 309 provided by the radio IC circuitry 106 (FIG. 1) and a transmit baseband processor (TX BBP) 404 for generating transmit baseband signals 311 for the radio IC circuitry 106. The baseband processing circuitry 400 may also include control logic 406 for coordinating the operations of the baseband processing circuitry 400.

In some embodiments (e.g., when analog baseband signals are exchanged between the baseband processing circuitry 400 and the radio IC circuitry 106), the baseband processing circuitry 400 may include ADC 410 to convert analog baseband signals received from the radio IC circuitry 106 to digital baseband signals for processing by the RX BBP 402. In these embodiments, the baseband processing circuitry 400 may also include DAC 412 to convert digital baseband signals from the TX BBP 404 to analog baseband signals.

In some embodiments that communicate OFDM signals or OFDMA signals, such as through baseband processor 108A, the transmit baseband processor 404 may be configured to generate OFDM or OFDMA signals as appropriate for transmission by performing an inverse fast Fourier transform (IFFT). The receive baseband processor 402 may be configured to process received OFDM signals or OFDMA signals by performing an FFT. In some embodiments, the receive baseband processor 402 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring to FIG. 1, in some embodiments, the antennas 101 (FIG. 1) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 101 may each include a set of phased-array antennas, although embodiments are not so limited.

Although the radio-architecture 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Figure 5:
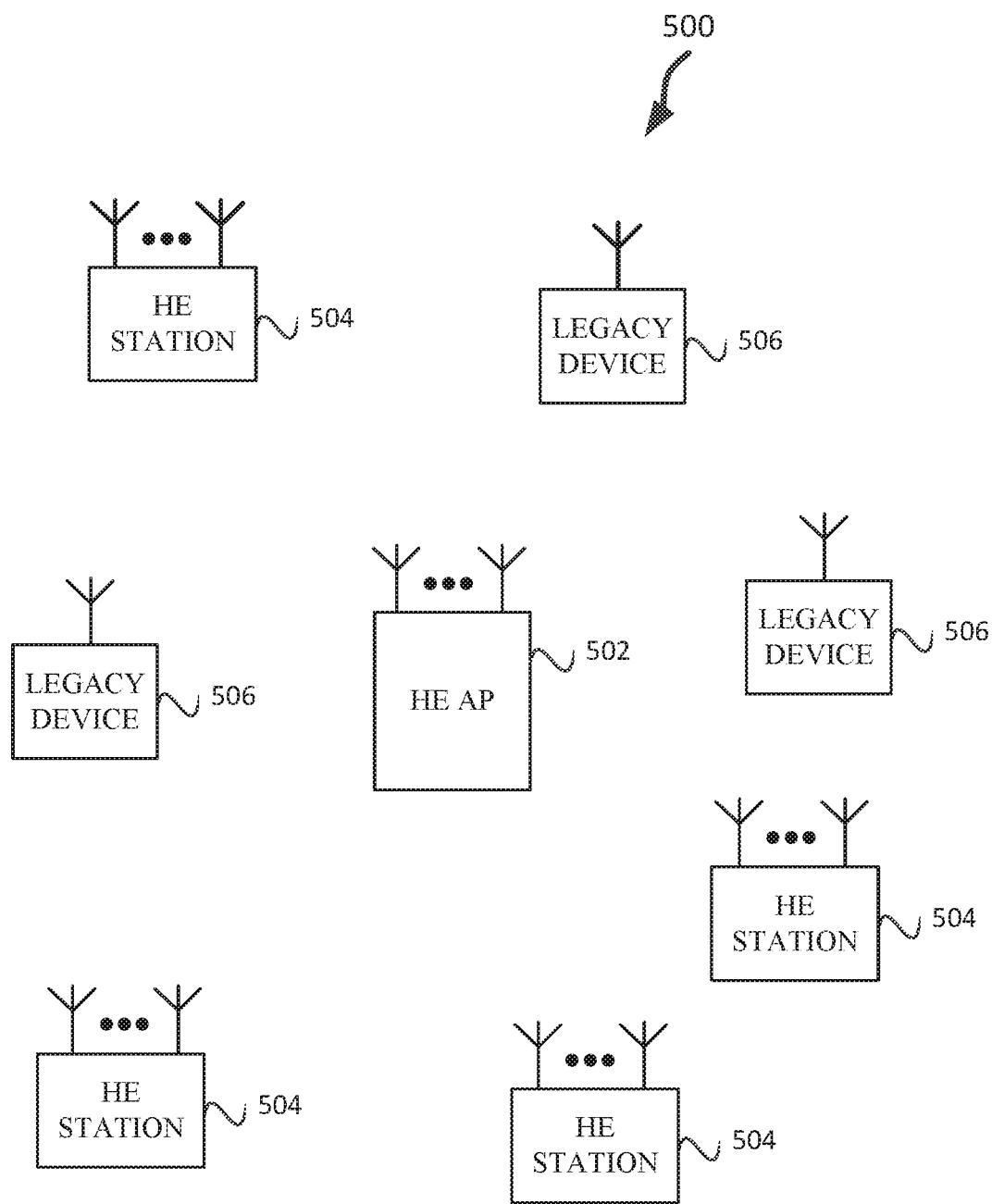
FIG. 5 illustrates a WLAN in accordance with some embodiments.

FIG. 5 illustrates a WLAN 500 in accordance with some embodiments. The WLAN 500 may comprise a basis service set (BSS) that may include a HE access point (AP) 502, which may be termed an AP, a plurality of HE (e.g., IEEE 802.11ax) stations (STAs) 504, and a plurality of legacy (e.g., IEEE 802.11g/n/ac) devices 506. In some embodiments, the HE STAs 504 and/or HE AP 502 are configured to operate in accordance with IEEE 802.11 extremely high throughput (EHT). In some embodiments, the HE STAs 504 and/or HE AP 520 are configured to operate in accordance with IEEE 802.11 az. In some embodiments, IEEE 802.11EHT may be termed Next Generation 802.11.

The HE AP 502 may be an AP using the IEEE 802.11 to transmit and receive. The HE AP 502 may be a base station. The HE AP 502 may use other communications protocols as well as the IEEE 802.11 protocol. The IEEE 802.11 protocol may be IEEE 802.11 ax. The IEEE 802.11 protocol may be IEEE 802.11 next generation. The EHT protocol may be termed a different name in accordance with some embodiments. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO). There may be more than one EHT AP 502 that is part of an extended service set (ESS). A controller (not illustrated) may store information that is common to the more than one HE APs 502 and may control more than one BSS, e.g., assign primary channels, colors, etc. HE AP 502 may be connected to the internet.

The legacy devices 506 may operate in accordance with one or more of IEEE 802.11 a/b/g/n/ac/ad/af/ah/aj/ay, or another legacy wireless communication standard. The legacy devices 506 may be STAs or IEEE STAs. In some embodiments, when the HE AP 502 and HE STAs 504 are configured to operate in accordance with IEEE 802.11EHT, the legacy devices 506 may include devices that are configured to operate in accordance with IEEE 802.11ax. The HE STAs 504 may be wireless transmit and receive devices such as cellular telephone, portable electronic wireless communication devices, smart telephone, handheld wireless device, wireless glasses, wireless watch, wireless personal device, tablet, or another device that may be transmitting and receiving using the IEEE 802.11 protocol such as IEEE 802.11 EHT or another wireless protocol. In some embodiments, the HE STAs 504 may be termed extremely high throughput (EHT) stations or stations.

The HE AP 502 may communicate with legacy devices 506 in accordance with legacy IEEE 802.11 communication techniques. In example embodiments, the HE AP 502 may also be configured to communicate with HE STAs 504 in accordance with legacy IEEE 802.11 communication techniques.

In some embodiments, a HE or EHT frame may be configurable to have the same bandwidth as a channel. The HE or EHT frame may be a physical Layer Convergence Procedure (PLCP) Protocol Data Unit (PPDU). In some embodiments, there may be different types of PPDUs that may have different fields and different physical layers and/or different media access control (MAC) layers. For example, a single user (SU) PPDU, multiple-user (MU) PPDU, extended-range (ER) SU PPDU, and/or trigger-based (TB) PPDU. In some embodiments EHT may be the same or similar as HE PPDUs.

The bandwidth of a channel may be 20 MHz, 40 MHz, or 80 MHz, 80+80 MHz, 160 MHz, 160+160 MHz, 320 MHz, 320+320 MHz, 640 MHz bandwidths. In some embodiments, the bandwidth of a channel less than 20 MHz may be 1 MHz, 1.25 MHz, 2.03 MHz, 2.5 MHz, 4.06 MHz, 5 MHz and 10 MHz, or a combination thereof or another bandwidth that is less or equal to the available bandwidth may also be used. In some embodiments the bandwidth of the channels may be based on a number of active data subcarriers. In some embodiments the bandwidth of the channels is based on 26, 52, 106, 242, 484, 996, or 2×996 active data subcarriers or tones that are spaced by 20 MHz. In some embodiments the bandwidth of the channels is 256 tones spaced by 20 MHz. In some embodiments the channels are multiple of 26 tones or a multiple of 20 MHz. In some embodiments a 20 MHz channel may comprise 242 active data subcarriers or tones, which may determine the size of a Fast Fourier Transform (FFT). An allocation of a bandwidth or a number of tones or sub-carriers may be termed a resource unit (RU) allocation in accordance with some embodiments.

In some embodiments, the 26-subcarrier RU and 52-subcarrier RU are used in the 20 MHz, 40 MHz, 80 MHz, 160 MHz and 80+80 MHz OFDMA HE PPDU formats. In some embodiments, the 106-subcarrier RU is used in the 20 MHz, 40 MHz, 80 MHz, 160 MHz and 80+80 MHz OFDMA and MU-MIMO HE PPDU formats. In some embodiments, the 242-subcarrier RU is used in the 40 MHz, 80 MHz, 160 MHz and 80+80 MHz OFDMA and MU-MIMO HE PPDU formats. In some embodiments, the 484-subcarrier RU is used in the 80 MHz, 160 MHz and 80+80 MHz OFDMA and MU-MIMO HE PPDU formats. In some embodiments, the 996-subcarrier RU is used in the 160 MHz and 80+80 MHz OFDMA and MU-MIMO HE PPDU formats.

A HE or EHT frame may be configured for transmitting a number of spatial streams, which may be in accordance with MU-MIMO and may be in accordance with OFDMA. In other embodiments, the HE AP 502, HE STA 504, and/or legacy device 506 may also implement different technologies such as code division multiple access (CDMA) 2000, CDMA 2000 1x, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, low-power BlueTooth®, or other technologies.

In accordance with some IEEE 802.11 embodiments, e.g., IEEE 802.11EHT/ax embodiments, a HE AP 502 may operate as a master station which may be arranged to contend for a wireless medium (e.g., during a contention period) to receive exclusive control of the medium for a transmission opportunity (TXOP). The HE AP 502 may transmit a EHT/HE trigger frame transmission, which may include a schedule for simultaneous UL transmissions from HE STAs 504. The HE AP 502 may transmit a time duration of the TXOP and sub-channel information. During the TXOP, HE STAs 504 may communicate with the HE AP 502 in accordance with a non-contention based multiple access technique such as OFDMA or MU-MIMO. This is unlike conventional WLAN communications in which devices communicate in accordance with a contention-based communication technique, rather than a multiple access technique. During the HE or EHT control period, the HE AP 502 may communicate with HE stations 504 using one or more HE or EHT frames. During the TXOP, the HE STAs 504 may operate on a sub-channel smaller than the operating range of the HE AP 502. During the TXOP, legacy stations refrain from communicating. The legacy stations may need to receive the communication from the HE AP 502 to defer from communicating.

In accordance with some embodiments, during the TXOP the HE STAs 504 may contend for the wireless medium with the legacy devices 506 being excluded from contending for the wireless medium during the master-sync transmission. In some embodiments the trigger frame may indicate an UL-MU-MIMO and/or UL OFDMA TXOP. In some embodiments, the trigger frame may include a DL UL-MU-MIMO and/or DL OFDMA with a schedule indicated in a preamble portion of trigger frame.

In some embodiments, the multiple-access technique used during the HE or EHT TXOP may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique. In some embodiments, the multiple access technique may be a Code division multiple access (CDMA).

The HE AP 502 may also communicate with legacy stations 506 and/or HE stations 504 in accordance with legacy IEEE 802.11 communication techniques. In some embodiments, the HE AP 502 may also be configurable to communicate with HE stations 504 outside the HE TXOP in accordance with legacy IEEE 802.11 or IEEE 802.11EHT/ax communication techniques, although this is not a requirement.

In some embodiments the HE station 504 may be a "group owner" (GO) for peer-to-peer modes of operation. A wireless device may be a HE station 502 or a HE AP 502.

In some embodiments, the HE STA 504 and/or HE AP 502 may be configured to operate in accordance with IEEE 802.11mc. In example embodiments, the radio architecture of FIG. 1 is configured to implement the HE STA 504 and/or the HE AP 502. In example embodiments, the front-end module circuitry of FIG. 2 is configured to implement the HE STA 504 and/or the HE AP 502. In example embodiments, the radio IC circuitry of FIG. 3 is configured to implement the HE station 504 and/or the HE AP 502. In example embodiments, the base-band processing circuitry of FIG. 4 is configured to implement the HE station 504 and/or the HE AP 502.

In example embodiments, the HE stations 504, HE AP 502, an apparatus of the HE stations 504, and/or an apparatus of the HE AP 502 may include one or more of the following: the radio architecture of FIG. 1, the front-end module circuitry of FIG. 2, the radio IC circuitry of FIG. 3, and/or the base-band processing circuitry of FIG. 4.

In example embodiments, the radio architecture of FIG. 1, the front-end module circuitry of FIG. 2, the radio IC circuitry of FIG. 3, and/or the base-band processing circuitry of FIG. 4 may be configured to perform the methods and operations/functions herein described in conjunction with FIGS. 1-18.

In example embodiments, the HE station 504 and/or the HE AP 502 are configured to perform the methods and operations/functions described herein in conjunction with FIGS. 1-18. In example embodiments, an apparatus of the EHT station 504 and/or an apparatus of the HE AP 502 are configured to perform the methods and functions described herein in conjunction with FIGS. 1-18. The term Wi-Fi may refer to one or more of the IEEE 802.11 communication standards. AP and STA may refer to EHT/HE access point 502 and/or EHT/HE station 504 as well as legacy devices 506.

In some embodiments, a HE AP STA may refer to a HE AP 502 and/or a HE STAs 504 that is operating as a HE APs 502. In some embodiments, when a HE STA 504 is not operating as a HE AP, it may be referred to as a HE non-AP STA or HE non-AP. In some embodiments, HE STA 504 may be referred to as either a HE AP STA or a HE non-AP.

Figure 6:
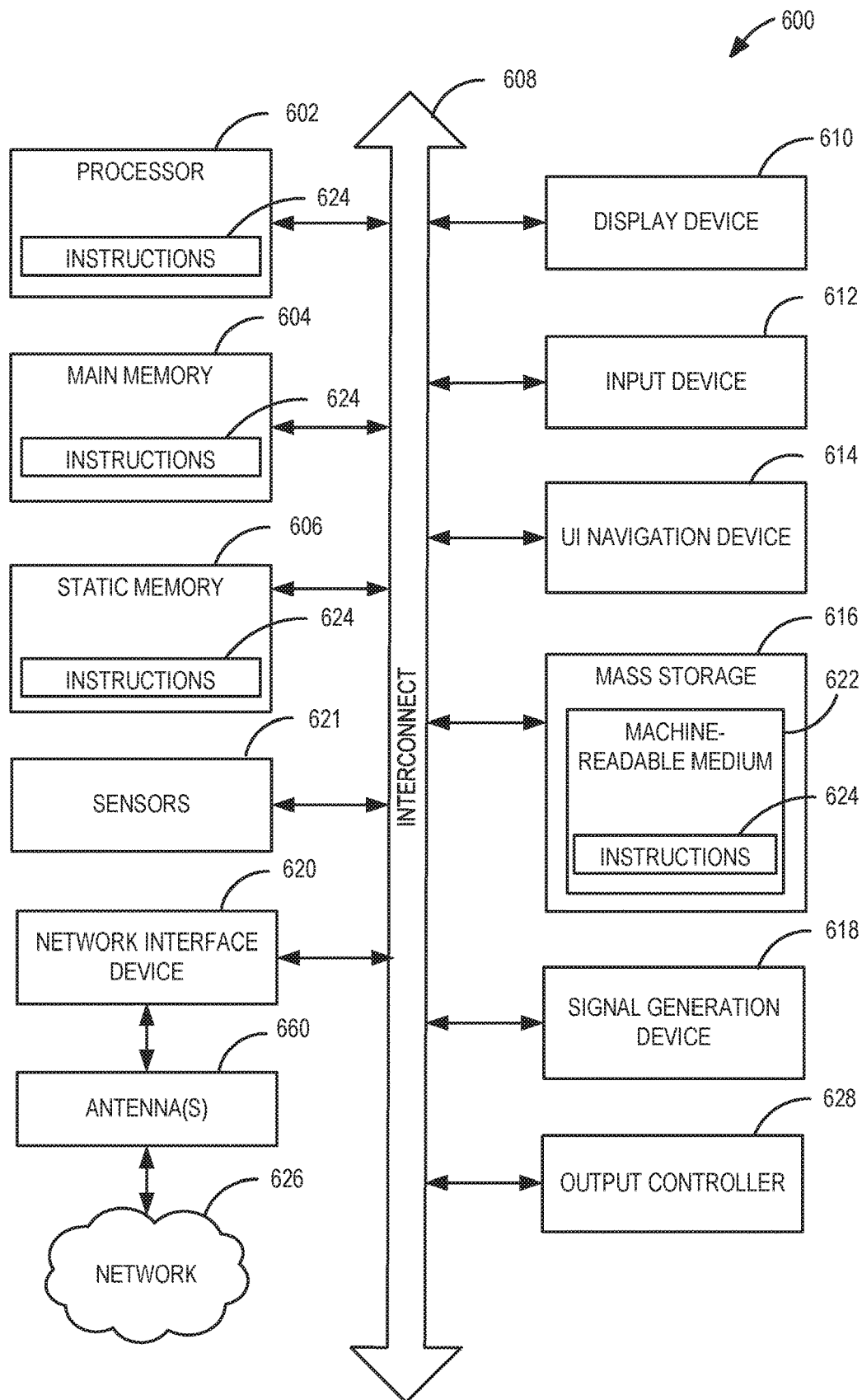
FIG. 6 illustrates a block diagram of an example machine upon which any one or more of the techniques (e.g., methodologies) discussed herein may perform.

FIG. 6 illustrates a block diagram of an example machine 600 upon which any one or more of the techniques (e.g., methodologies) discussed herein may perform. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a HE AP 502, EVT station 504, personal computer (PC), a tablet PC, a set-top box (STB), a personal digital assistant (PDA), a portable communications device, a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608.

Specific examples of main memory 604 include Random Access Memory (RAM), and semiconductor memory devices, which may include, in some embodiments, storage locations in semiconductors such as registers. Specific examples of static memory 606 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks.

The machine 600 may further include a display device 610, an input device 612 (e.g., a keyboard), and a user interface (UI) navigation device 614 (e.g., a mouse). In an example, the display device 610, input device 612 and UI navigation device 614 may be a touch screen display. The machine 600 may additionally include a mass storage (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments the processor 602 and/or instructions 624 may comprise processing circuitry and/or transceiver circuitry.

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

Specific examples of machine readable media may include: non-volatile memory, such as semiconductor memory devices (e.g., EPROM or EEPROM) and flash memory devices; magnetic disks, such as internal hard disks and removable disks; magneto-optical disks; RAM; and CD-ROM and DVD-ROM disks.

While the machine readable medium 622 is illustrated as a single medium, the term "machine readable medium" may include a single medium or multiple media (e.g., a centralized or distributed database, and/or associated caches and servers) configured to store the one or more instructions 624.

An apparatus of the machine 600 may be one or more of a hardware processor 602 (e.g., a central processing unit (CPU), a graphics processing unit (GPU), a hardware processor core, or any combination thereof), a main memory 604 and a static memory 606, sensors 621, network interface device 620, antennas 660, a display device 610, an input device 612, a UI navigation device 614, a mass storage 616, instructions 624, a signal generation device 618, and an output controller 628. The apparatus may be configured to perform one or more of the methods and/or operations disclosed herein. The apparatus may be intended as a component of the machine 600 to perform one or more of the methods and/or operations disclosed herein, and/or to perform a portion of one or more of the methods and/or operations disclosed herein. In some embodiments, the apparatus may include a pin or other means to receive power. In some embodiments, the apparatus may include power conditioning hardware.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine-readable media. In some examples, machine readable media may include machine readable media that is not a transitory propagating signal.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 620 may include one or more physical jacks (e.g., Ethernet, coaxial, or phone jacks) or one or more antennas to connect to the communications network 626. In an example, the network interface device 620 may include one or more antennas 660 to wirelessly communicate using at least one of single-input multiple-output (SIMO), multiple-input multiple-output (MIMO), or multiple-input single-output (MISO) techniques. In some examples, the network interface device 620 may wirelessly communicate using Multiple User MIMO techniques. The term "transmission medium" shall be taken to include any intangible medium that is capable of storing, encoding or carrying instructions for execution by the machine 600, and includes digital or analog communications signals or other intangible medium to facilitate communication of such software.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Some embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

Figure 7:
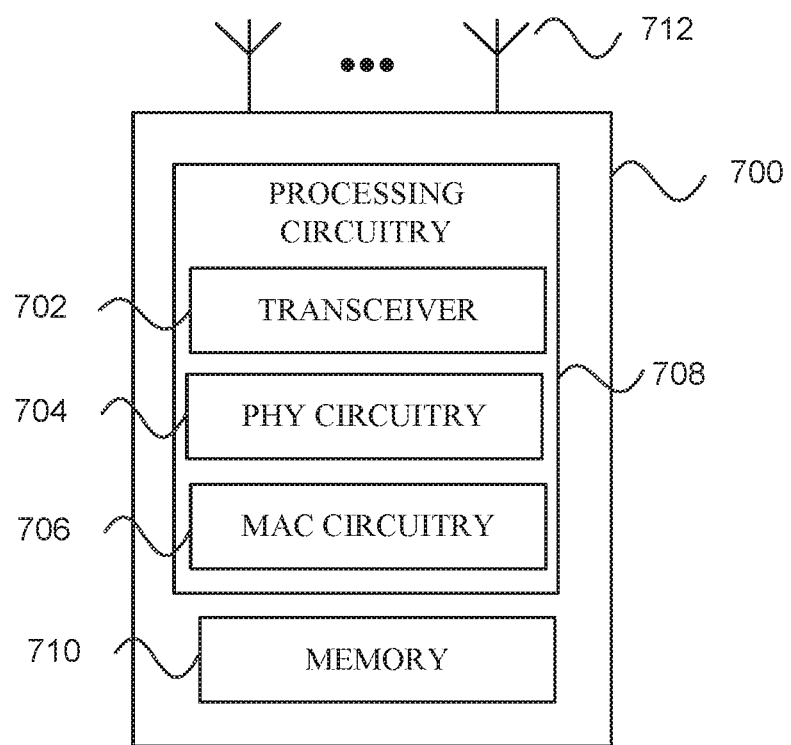
FIG. 7 illustrates a block diagram of an example wireless device upon which any one or more of the techniques (e.g., methodologies or operations) discussed herein may perform.

FIG. 7 illustrates a block diagram of an example wireless device 700 upon which any one or more of the techniques (e.g., methodologies or operations) discussed herein may perform. The wireless device 700 may be a HE device or HE wireless device. The wireless device 700 may be a HE STA 504, HE AP 502, and/or a HE STA or HE AP. A HE STA 504, HE AP 502, and/or a HE AP or HE STA may include some or all of the components shown in FIGS. 1-7. The wireless device 700 may be an example machine 600 as disclosed in conjunction with FIG. 6.

The wireless device 700 may include processing circuitry 708. The processing circuitry 708 may include a transceiver 702, physical layer circuitry (PHY circuitry) 704, and MAC layer circuitry (MAC circuitry) 706, one or more of which may enable transmission and reception of signals to and from other wireless devices 700 (e.g., HE AP 502, HE STA 504, and/or legacy devices 506) using one or more antennas 712. As an example, the PHY circuitry 704 may perform various encoding and decoding functions that may include formation of baseband signals for transmission and decoding of received signals. As another example, the transceiver 702 may perform various transmission and reception functions such as conversion of signals between a baseband range and a Radio Frequency (RF) range.

Accordingly, the PHY circuitry 704 and the transceiver 702 may be separate components or may be part of a combined component, e.g., processing circuitry 708. In addition, some of the described functionality related to transmission and reception of signals may be performed by a combination that may include one, any or all of the PHY circuitry 704 the transceiver 702, MAC circuitry 706, memory 710, and other components or layers. The MAC circuitry 706 may control access to the wireless medium. The wireless device 700 may also include memory 710 arranged to perform the operations described herein, e.g., some of the operations described herein may be performed by instructions stored in the memory 710.

The antennas 712 (some embodiments may include only one antenna) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 712 may be effectively separated to take advantage of spatial diversity and the different channel characteristics that may result.

One or more of the memory 710, the transceiver 702, the PHY circuitry 704, the MAC circuitry 706, the antennas 712, and/or the processing circuitry 708 may be coupled with one another. Moreover, although memory 710, the transceiver 702, the PHY circuitry 704, the MAC circuitry 706, the antennas 712 are illustrated as separate components, one or more of memory 710, the transceiver 702, the PHY circuitry 704, the MAC circuitry 706, the antennas 712 may be integrated in an electronic package or chip.

In some embodiments, the wireless device 700 may be a mobile device as described in conjunction with FIG. 6. In some embodiments the wireless device 700 may be configured to operate in accordance with one or more wireless communication standards as described herein (e.g., as described in conjunction with FIGS. 1-6, IEEE 802.11). In some embodiments, the wireless device 700 may include one or more of the components as described in conjunction with FIG. 6 (e.g., display device 610, input device 612, etc.) Although the wireless device 700 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

In some embodiments, an apparatus of or used by the wireless device 700 may include various components of the wireless device 700 as shown in FIG. 7 and/or components from FIGS. 1-6. Accordingly, techniques and operations described herein that refer to the wireless device 700 may be applicable to an apparatus for a wireless device 700 (e.g., HE AP 502 and/or HE STA 504), in some embodiments. In some embodiments, the wireless device 700 is configured to decode and/or encode signals, packets, and/or frames as described herein, e.g., PPDUs.

In some embodiments, the MAC circuitry 706 may be arranged to contend for a wireless medium during a contention period to receive control of the medium for a HE TXOP and encode or decode an HE PPDU. In some embodiments, the MAC circuitry 706 may be arranged to contend for the wireless medium based on channel contention settings, a transmitting power level, and a clear channel assessment level (e.g., an energy detect level).

The PHY circuitry 704 may be arranged to transmit signals in accordance with one or more communication standards described herein. For example, the PHY circuitry 704 may be configured to transmit a HE PPDU. The PHY circuitry 704 may include circuitry for modulation/demodulation, upconversion/downconversion, filtering, amplification, etc. In some embodiments, the processing circuitry 708 may include one or more processors. The processing circuitry 708 may be configured to perform functions based on instructions being stored in a RAM or ROM, or based on special purpose circuitry. The processing circuitry 708 may include a processor such as a general purpose processor or special purpose processor. The processing circuitry 708 may implement one or more functions associated with antennas 712, the transceiver 702, the PHY circuitry 704, the MAC circuitry 706, and/or the memory 710. In some embodiments, the processing circuitry 708 may be configured to perform one or more of the functions/operations and/or methods described herein.

In mmWave technology, communication between a station (e.g., the HE stations 504 of FIG. 5 or wireless device 700) and an access point (e.g., the HE AP 502 of FIG. 5 or wireless device 700) may use associated effective wireless channels that are highly directionally dependent. To accommodate the directionality, beamforming techniques may be utilized to radiate energy in a certain direction with certain beamwidth to communicate between two devices. The directed propagation concentrates transmitted energy toward a target device in order to compensate for significant energy loss in the channel between the two communicating devices. Using directed transmission may extend the range of the millimeter-wave communication versus utilizing the same transmitted energy in omni-directional propagation.

In some embodiments, there is a secure mode for ranging (e.g., fine timing measurements.) In some embodiments, the long-training fields (LTFs), e.g., HEZ-LFT 808, of NDPs, e.g., 800, are encrypted. However, for long range measurements, a peak to average ratio (PAPR) of the LTFs needs to be low to lessen distortion, e.g., due to clipping is minimized. Additionally, the larger the number of possible encryptions of the LTFs the harder it is for an attacker to determine or guess the encryption used to generate the LTFs. The methods and apparatuses disclosed herein provide a large number of LTFs with an acceptable PAPR that may be generated from a cipher.

Figure 8:
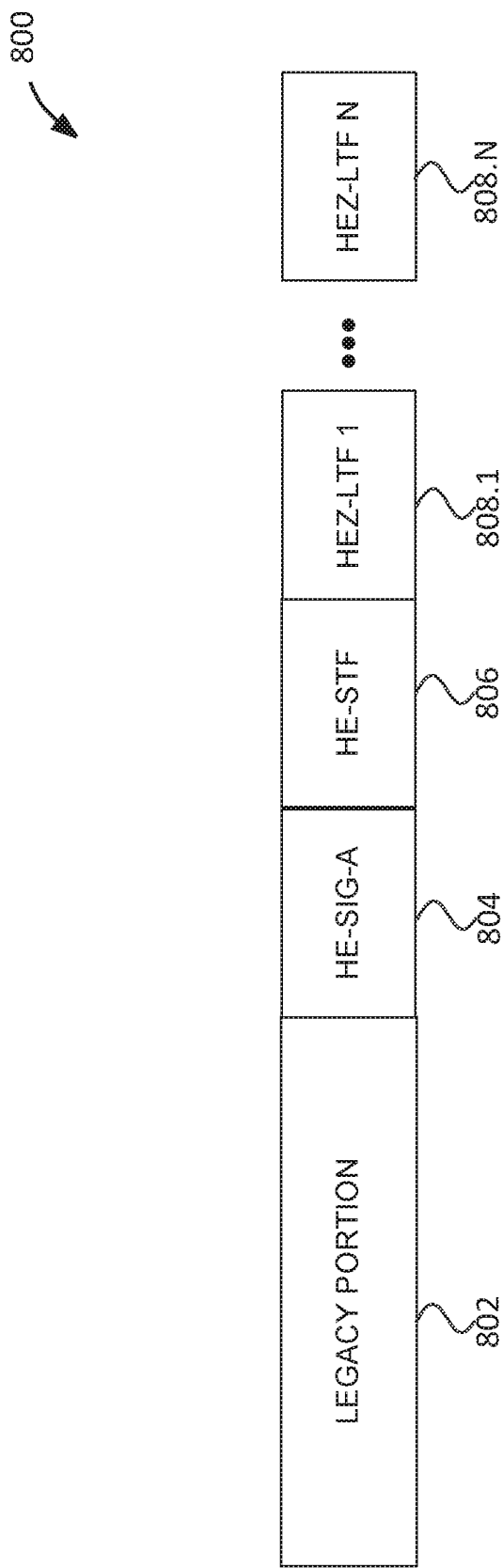
FIG. 8 illustrates a null data packet (NDP) in accordance with some embodiments.

FIG. 8 illustrates a null data packet (NDP) 800 in accordance with some embodiments. Illustrated in FIG. 8 is legacy portion 802, HE-signal (SIG)-A 804, HE-short training field (STF) 806, and HEZ-LTF 808.1 through HEZ-LTF N 808.N. The legacy portion 802 may include one or more legacy field. The HE-SIG-A 804 may include information regarding decoding the NDP 800. The HE-STF 806 may be a short training field. The HEZ-LTF 808.1 through HEZ-LTF 808.N may be in secure mode phase rotated 8 Phase Shift Keying (PSK) constellation points and may be generated from bit sequences 1010 and the methods disclosed in conjunction with FIGS. 9-17. In some embodiments, each of the HEZ-LTFs 808 may be 8 μs or 7.2 μs in duration. In secure mode the LTFs 808 may be termed HEz-LTFs. The HEZ-LTFs 808 may be transmitted across a bandwidth, e.g., 20, 40, 80, 80+80, or 160 MHz, in accordance with some embodiments. The different bandwidths may have a number of subcarriers, e.g., 80 MHz may have 512 subcarriers.

Figure 9:
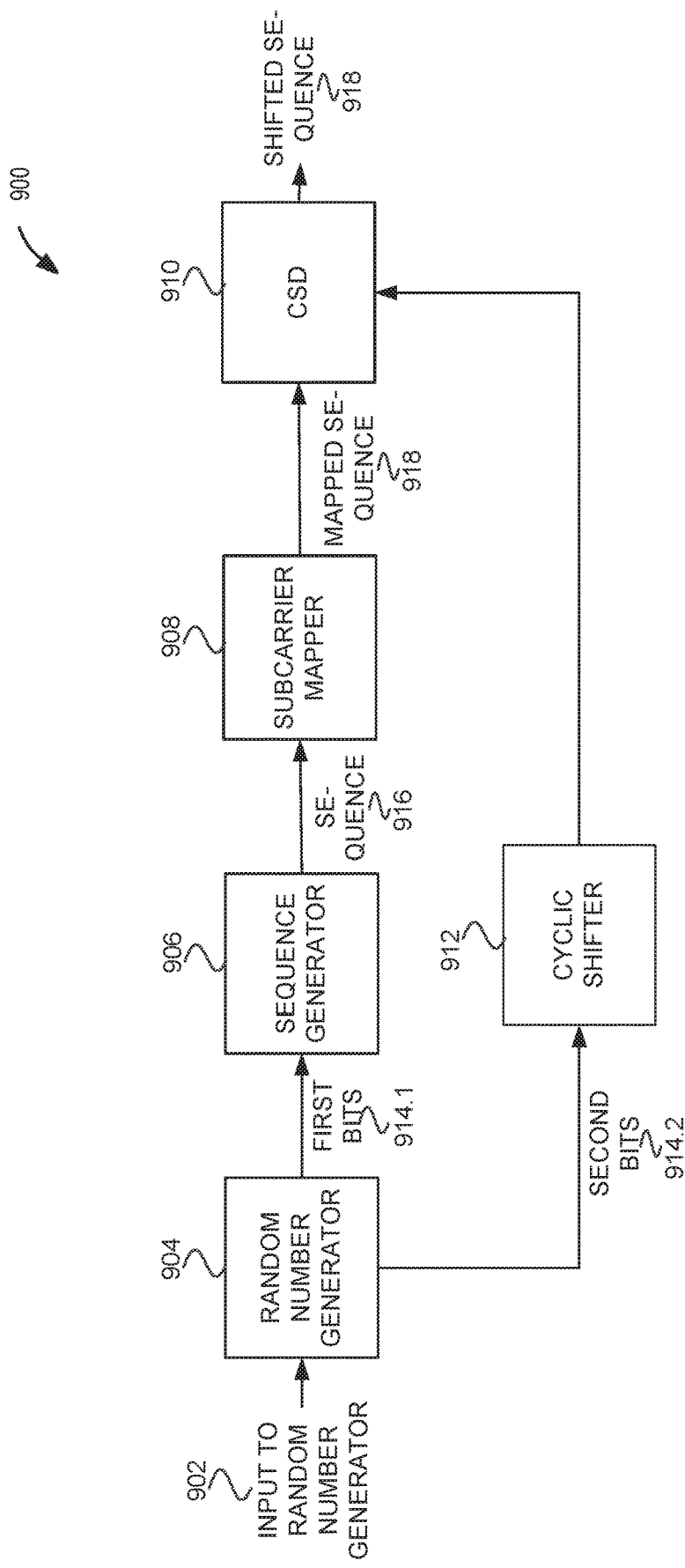
FIG. 9 illustrates a method of generating secure sounding signals in accordance with some embodiments.

FIG. 9 illustrates a method 900 of generating secure sounding signals in accordance with some embodiments. Illustrated in FIG. 9 is input to random number generator 902, random number generator 904, first bits 914.1, second bits 914.2, sequence generator 906, sequence 916, subcarrier mapper 908, mapped sequence 918, cyclic shift diversity (CSD) 910, cyclic shifter 912, and shifted sequence 918.

Figure 10:
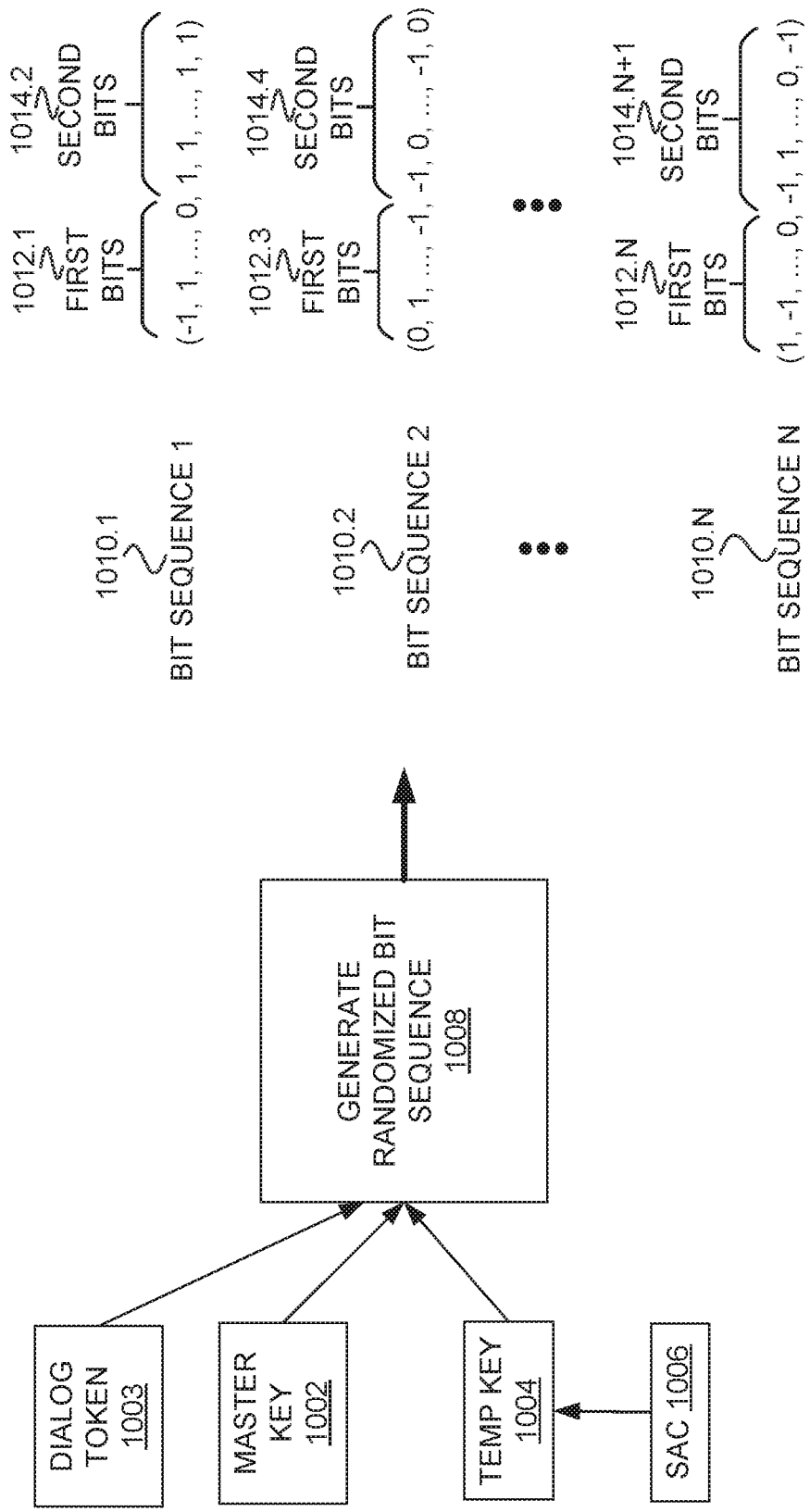
FIG. 10 illustrates generation of bit sequences, in accordance with some embodiments.

The input to random number generator 902 may be one or more of master key 1002, temp key 1004, dialog token 1003, and SAC 1006, as disclosed in conjunction with FIG. 10. The input to random number generator 902 may include one or more additional inputs.

The random number generator 904 may be the same as or similar to generate randomized bit sequence 1008 as disclosed in conjunction with FIG. 10. The first bits 914.1 and the second bits 914.2 may be the same or similar as first bits 1012 and second bits 1014, respectively, as disclosed in conjunction with FIG. 10. In some embodiments, the first bits 1012 and second bits 1014 may overlap, e.g., the second bits 1014 may include some of the first bits 1012. In some embodiments, the first bits 1012 and second bits 1014 may be the same bits.

The sequence generator 906 may generate a sequence 916 using the first bits 914.1 as described herein and in conjunction with FIGS. 11-17. The sequence 916 may be a series of one or more of: ones (1's), negative ones (−1's), j's, −j's, complex numbers like 8PSK symbols exp(j2πk/8), and in some embodiments, zeros (0's). The subcarrier mapper 908 may map the sequence 916 to subcarriers (e.g., 1402) in the frequency domain, e.g., 512 subcarriers for an 80 MHz bandwidth for the HEZ-LTF 808, to generate a mapped sequence 918. The sequence 916 may be treated as Binary Phase Shift Keying (BPSK), QPSK (Quadrature Phase Shift Keying), QBPSK (Quadrature Binary Phase Shift Keying), or 8PSKsymbol sequence loaded in the subcarriers in the frequency domain.

The length of the first bits 914.1 is approximately M*log (N), where N is the length of the sequence 916; and M is a scaler, e.g., 1 to 10, in accordance with some embodiments. In some embodiment, the length of the first bits 914.1 is $3(\log_2(N)+1)$.

Figure 12:
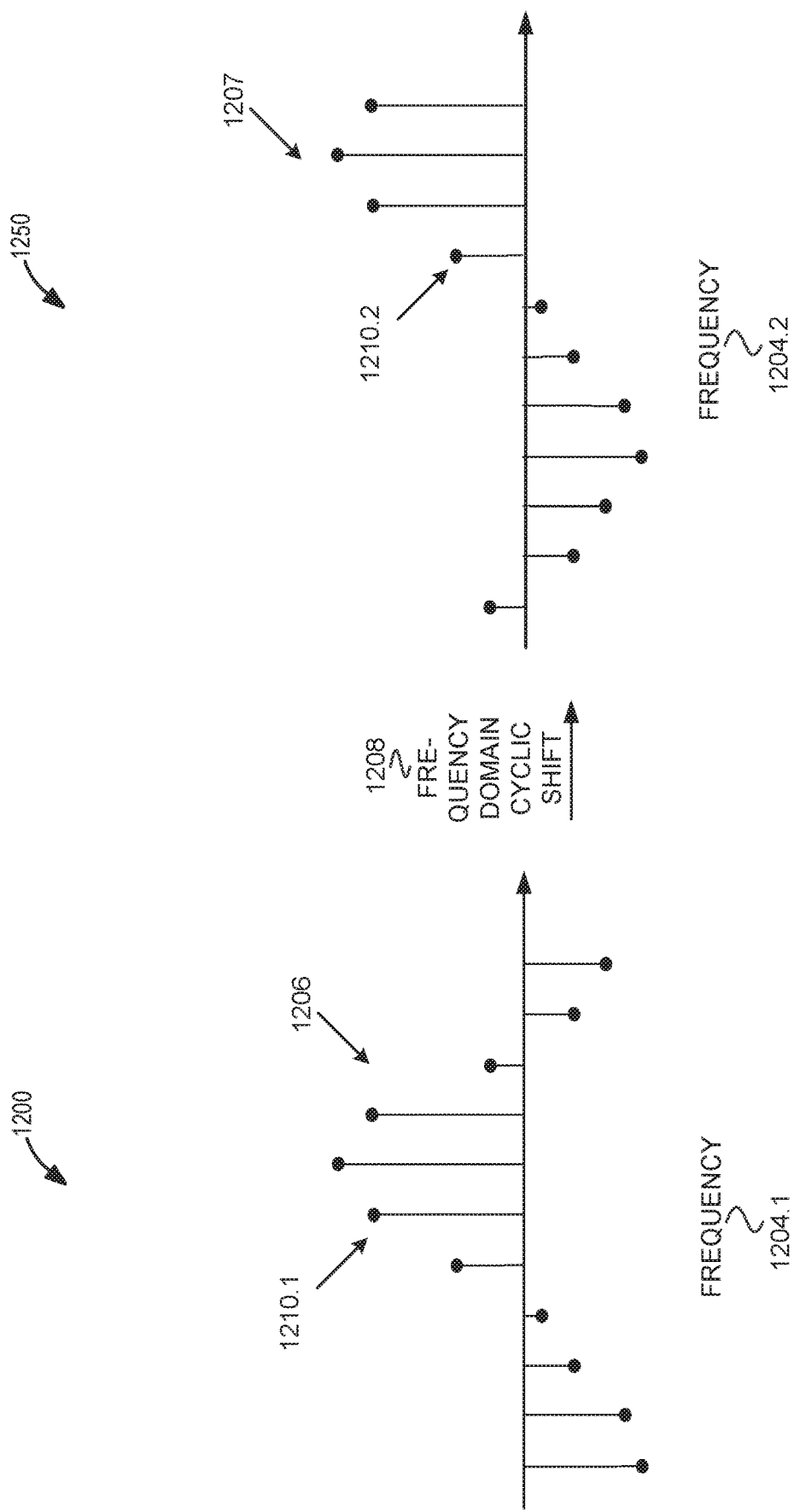
FIG. 12 illustrates a frequency-domain cyclic shift, in accordance with some embodiments.

The cyclic shifter 912 may determine what shifting to do with the mapped sequence 918 based on the second bits 914.2, e.g., in a frequency domain and/or time domain as described herein, e.g., FIG. 12 and the accompanying disclosure. For example, for second bits 914.2 of {1110}, the first two bits may be for a frequency domain shift indicating the shift amount is 3 subcarriers to a higher frequency, which may include wraparound.

The cyclic shift diversity (CSD) 910 may perform the shifting on the mapped sequence 918 to generate the shifted sequence 918, in accordance with some embodiments. In some embodiments, cyclic shifter 912 and CSD 910 are optional. After a frequency domain shift, the CSD 910 may puncture the mapped sequence 918 to reserve space for the DC and edge guard subcarriers. In some embodiments, the subcarrier mapper 908 may puncture the sequence 916 to reserve space for the DC and edge guard subcarriers to generate the mapped sequence 918. After the puncturing, a time domain shift (e.g., FIG. 11 and accompanying disclosure) may be performed, e.g., the second two bits from above (101 may indicate a time shift amount of 2 time samples. The order of the frequency domain shift, the puncturing, and the time domain shift may be different. The frequency domain shift may be optional. The time domain shift may be implemented in frequency domain by adding a linear phase shift to the mapped sequence 918 across subcarriers in the frequency domain before converting the frequency domain signal to the time domain. In accordance with some embodiments, if a CSD is implemented in a frequency domain, a linear phase shift is applied across subcarriers over the 8PSK symbols. In accordance with some embodiments, if a CSD is implemented in a time domain, there is no linear phase shift applied to the 8PSK symbols.

The shifted sequence 918 may be used to generate sounding signals, e.g. HEZ-LTFs 808, which may be used for ranging and positioning. A large number of sounding signals from the shifted sequence 918 may be generated, in accordance with some embodiments. The large number of sounding symbols may have the advantage of making it harder for an attacker to guess which sounding symbol is used. The different sounding signals are generated from the output of the random number generator 904. The transmitter of the sounding symbols, e.g., ISTA 1502 or RSTA 1504, and the receiver of the sounding symbols, e.g., ISTA 1502 or RSTA 1504, may have a shared secret, e.g., one or more of master key 1002, temp key 1004, which enables both the transmitter and the receiver to generate the same first bits 914.1 and second bits 914.2. In some embodiments, a dialog token 1003 may be used in conjunction with the master key 1002 and/or temp key 1004 to generate the same first bits 914.1 and second bits 914.2. The receiver of the HEZ-LTFs 808 can then generate the shifted sequence 918 that the transmitter should have used to transmit the HEZ-LTFs 808 to authenticate the transmitter.

The method 900 of secure sounding signals may generate multiple shifted sequences 918, e.g., one for each of the HEZ-LTFs 808, which may be for different antenna, e.g., spatial streams and/or repeated sounding transmissions of the same antennas with different sounding signals. The shifted sequences 918 may be derived from Golay sequences and may generate sounding signals that have a low peak-to-average power ratio (PAPR) as disclosed herein. In some embodiments, the input to random number generator 902 may further include number of output bits, parameter length, and indexes of selected parameters.

In some embodiments, random number generator 904 may generate first bits 914.1, and the sequence generator 906 may generate sequence 916 with a length that is 2 or more times of the first bits 914.1, where sequence generator 906 may use duplication, concatenation, interleaving, sign change, and BPSK/QPSK/QBPSK/8PSK as disclosed herein.

FIG. 10 illustrates generation of bit sequences 1010, in accordance with some embodiments. Illustrated in FIG. 10 is dialog token 1003, master key 1002, temp key 1004, SAC 1006, generate randomized bit sequence 1008, and bit sequence 1 1010.1 through bit sequence N 1010.N. The master key 1002 may be master key, e.g., 1520, 1522. The temp key 1004 may be a temporary key, e.g., next key 1536, 1532. SAC 1006 may be SAC associated with the temp key 1004, e.g., next SAC 1534, SAC 1524, 1528 associated with temp key 1536. The generate randomized BIT sequence 1008 may generate bit sequence 1 1010.1 through bit sequence N 1010.N. The bit sequences 1010 may be used to generate HEZ-LTF 1 808.1 through HEZ-LTF N 808.N. The bit sequences 1010 may include two or more of 1's, 0's, −1's, j's, −j's, and complex numbers like 8PSK symbols. For example, the bit sequences 1010 may be used as disclosed in conjunction with FIG. 9 to generate shifted sequences 918 to generate the HEZ-LTFs 808. Generate randomized bit sequence 1008 may use one or more of dialog token 1003, master key 1002, and temp key 1004 to generate the bit sequences 1010, in accordance with some embodiments. In some embodiments, other inputs may be used to generate randomized bit sequence 1008. In some embodiments, the transmitter and receiver of the NDP 800 use the same input (e.g., 1003, 1002, 1004) to generate the bit sequences 1010. The SAC 1006 may be a number that is associated with temp key 1004, e.g., SAC 1006 may identify temp key 1004. The bit sequences 1010 may include first bits 1012 and second bits 1014, which may be used as disclosed in conjunction with FIG. 9.

Figure 11:
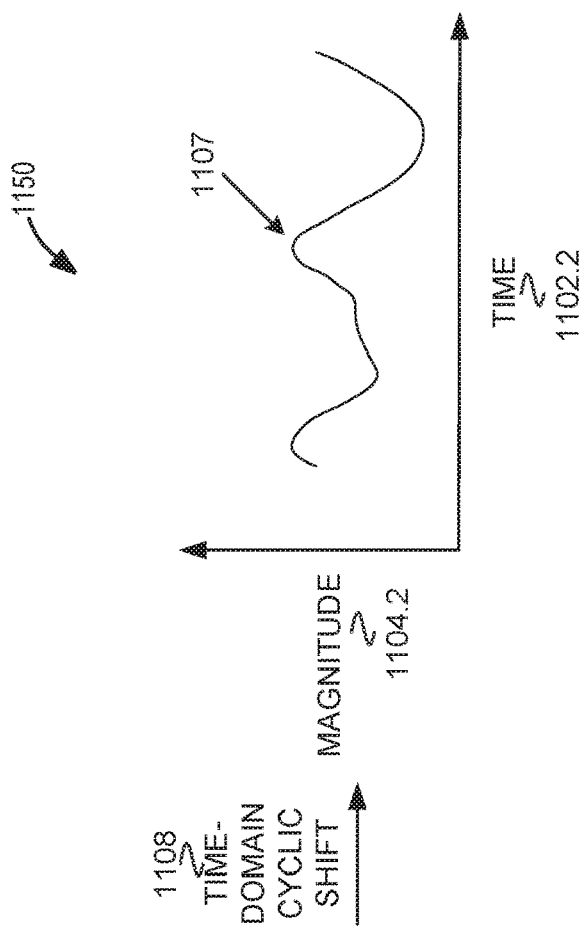
FIG. 11 illustrates a time-domain cyclic shift, in accordance with some embodiments.
Figure 11:
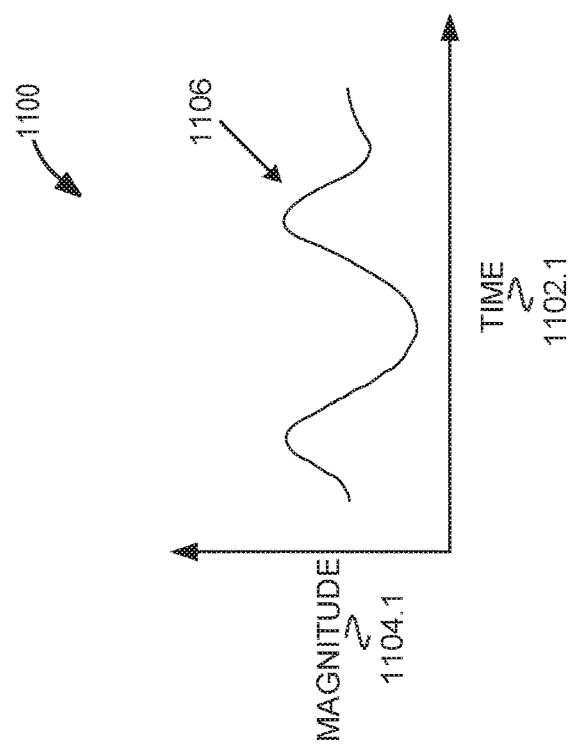

FIG. 11 illustrates a time-domain cyclic shift, in accordance with some embodiments. Illustrated in FIG. 11 is graph of original signal 1100 and graph of time-domain cyclic shifted signal 1150. Graph of original signal 1100 and graph of time-domain shifted signal 1150 comprise time 1102 along a horizontal axis, magnitude 1104 along a vertical axis, original signal 1106, and cyclic shifted signal 1107. In accordance with some embodiments, the PAPR remains similar or the same when the original signal 1106 is time-domain cyclically shifted 1108 in the time domain. Since time-domain cyclically shifting 1108 the original signal 1106 in the time domain does not change peak and average power, the PAPR remains the same for cyclic shifted signal 1107 as for original signal 1106. The original signal 1106 may be generated from a Golay sequence.

Time-domain cyclically shifting 1108 in the time domain may be used to generate low PAPR cyclically shifted signals 1107 from original signals 1106 that have a low PAPR. The cyclically shifted signal 1107 is a different signal than the original signal 1106 so it can be used as a signal generated from a cipher (e.g., bit sequence 1010). For an 80 MHz bandwidth of the HEZ-LTFs 808 with a 2x symbol duration, there may be 512 subcarriers in the 80 MHz bandwidth. Without oversampling, the original signal 1106 in the time domain has 512 samples excluding the cyclic prefix (CP). A CP may not be present in a secure sounding signal, e.g., original signal 1106 or LTFs 808. In some embodiments, the step size of the time-domain shift may be one sample that corresponds to 12.5 ns. That means that each original signal 1106 can be shifted 512 times to generate 512 cyclic shifted signals 1107 from one original signal 1106. With oversampling the step size can be smaller and thus more cyclic shifted signals 1107 per original signal 1106 can be generated by the transmitter. A 20 MHz band for 2x symbol duration has 128 subcarriers and 40 MHz band for 2x symbol duration has 256 subcarriers. Therefore, 128 cyclic shifted signals 1107 can be generated without oversampling from each original signal 1106, and 256 cyclic shifted signals 1107 can be generated without oversampling from each original signal 1106.

FIG. 12 illustrates a frequency-domain cyclic shift, in accordance with some embodiments. Illustrated in FIG. 12 is graph of original signal 1200, graph of frequency-domain cyclic shifted signal 1250, frequency-domain cyclic shift 1208. Graph of original signal 1200 and graph of time-domain shifted signal 1250 comprise time frequency 1204 along a horizontal axis, original signal 1206, cyclic shifted signal 1207, and subcarriers 1210. The original signal 1206 may be generated from a Golay sequence.

The PAPR of the original signal 1206 may not remain the same after it is frequency-domain cyclic shifted 1208 to generate the cyclic shifted signal 1207. However, the PAPR degradation is within 1 dB. An original signal 1206 with an acceptable PAPR may be used to generate (by frequency-domain cyclic shift 1208) N cyclic shifted signals 1207, where N is the number of subcarriers 1210 in the bandwidth of the channel, e.g., 80 MHz channel has 512 subcarriers 1210, 40 MHz channel has 256 subcarriers 1210, and 20 MHz channel has 128 subcarriers 1210, in accordance with some embodiments. The subcarriers 1210 include DC subcarriers (not illustrated) and edge guard subcarriers (not illustrated).

In accordance with some embodiments, the PAPR remains similar or the same when the original signal 1206 is frequency-domain cyclically shifted 1208 in the frequency domain.

Figure 13:
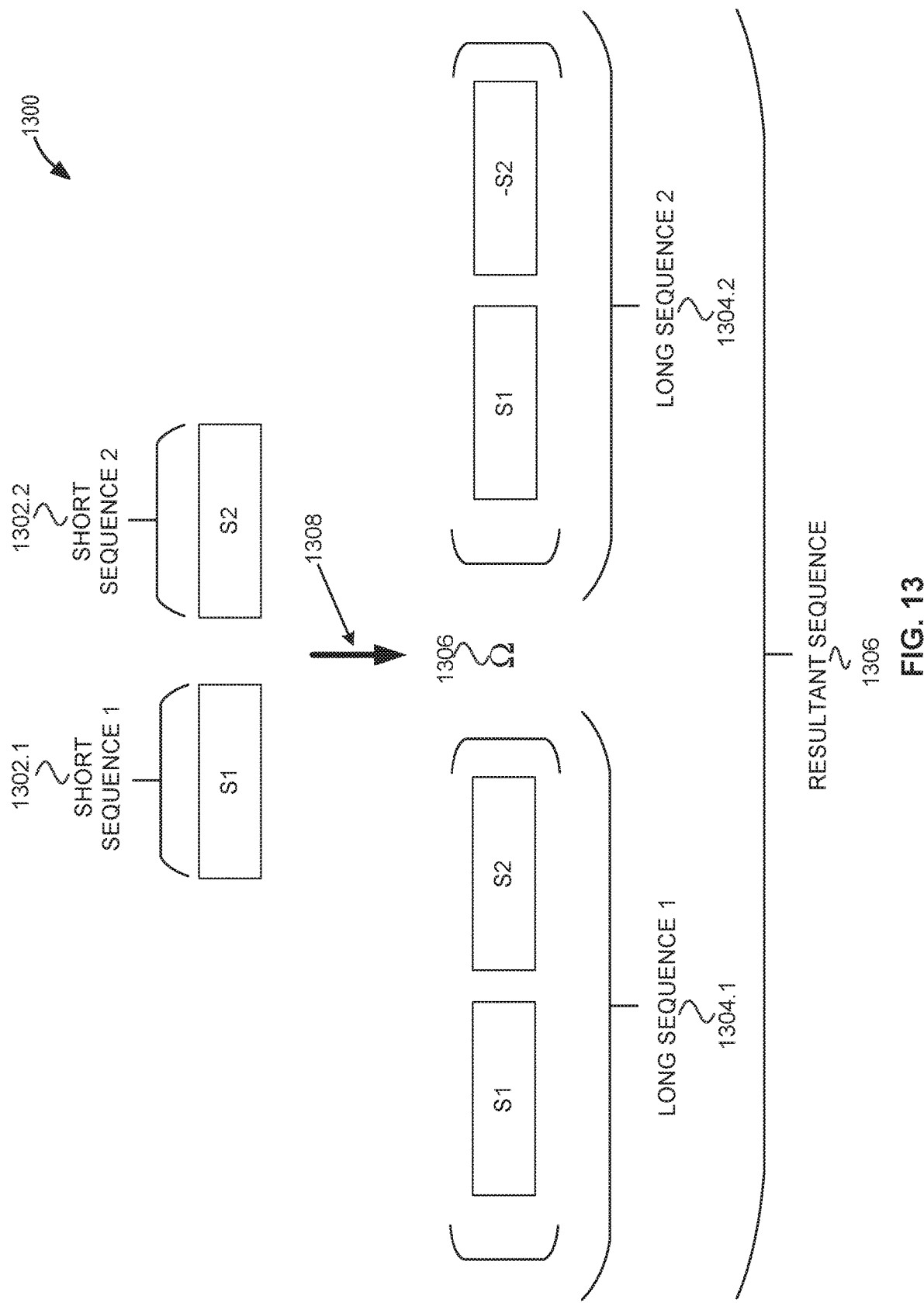
FIG. 13 illustrates concatenating sequences, in accordance with some embodiments.

FIG. 13 illustrates concatenating sequences 1300, in accordance with some embodiments. Illustrated in FIG. 13 is short sequence 1 1302.1 (S1), short sequence 2 1302.2 (S2), concatenate 1308, long sequence 1 1304.1, long sequence 2 1304.2, and Ω 1306.

S1 1302.1 and S2 1302.2 may be Golay sequences. If S1 1302.1 and S2 1302.2 are real numbers and Ω 1306 is a real number, then the long sequence 1 1304.1 and long sequence 2 1304.2 are real. Golay sequences may be generated by interleaving and reversion of S1 1302.1 and S2 1302.2. Complementary pairs of Golay sequences usually have low PAPRs. Complementary Golay sequences are pairs of Golay sequences such that their out-of-phase aperiodic autocorrelation coefficients sum to zero.

The resultant sequence 1306 is loaded onto the subcarriers of the bandwidth in the frequency domain, e.g., bandwidth of HEZ-LTF 808 with a bandwidth having subcarriers. Some of the subcarriers may be used for DC and edge subcarriers. An IFFT is applied and the time domain signal is sent for channel sounding, e.g., the NDP 800 is transmitted.

In some embodiments, when real numbers are used in the frequency domain, symmetry about the middle of the sequences (e.g., 1304.1, 1304.2) are vulnerable to replay attack when they are sent in the time domain. In some embodiments, real sounding sequences (e.g., 1304.1 and/or 1304.2) are avoided to lessen the chance of replay attacks.

In some embodiments, short sequence 1 1302.1 and short sequence 2 1302.2 may include an imaginary part. For example, short sequence 1 1302.1 and short sequence 2 1302.2 may be ([1], [j]) rather than ([1], [1]), where j is the square root of −1. Concatenations may be used to increase the length of the sequences, e.g., 1302.1, 1302.2. The sequences (1302.1, 1302.2) may be longer than one. The process of generating resultant sequence 1306 (long sequences 1304.1, 1304.2) may be repeated, e.g., long sequence 1 1304.1 and long sequence 2 1304.2 may be substituted in for short sequence 1 1302.1 and short sequence 2 1302.2. The process repeats until the resultant sequence reaches the desired length.

In some embodiments, starting with short initial sequences of length 1 or 2 (e.g., 1302.1, 1302.2) may require a number of iterations of concatenation to generate a sequence (e.g., 1306) that is long enough for the number of subcarriers (512, 256, 128) for the bandwidth of the NDP 800. In some embodiments, longer initial sequences than 2 may be used for the initial sequences (e.g., 1302.1, 1302.2). In some embodiments, short sequence 1 1302.1, and short sequence 2 1302.2 may be a complementary pair of Golay sequences. In some embodiments, short sequence 1 1302.1, and short sequence 2 1302.2 may be random sequences. In some embodiments, Ω 1306 may be complex, e.g., include j or −j or exp(j2πk/8). In some embodiments, Ω 1306 may be a constant. In some embodiments, Ω 1306 may take different values for different iterations of the concatenations and/or for different members of the sequences (e.g., 1304.1, 1304.2).

In some embodiments, for an n-th iteration of concatenation, two short sequences (e.g., 1302.1, 1302.2) are concatenated to make two long sequences (e.g., 1304.1, 1304.2) using Ω 1306, which may have different values for different iterations, e.g., $\Omega_N$ 1306. For example, $\Omega_N$ may equal j or −j (or in some embodiments, 1 or −1; or 8PSK constellation values), where a random bit (e.g., bit sequences 1010) may be used to select the value of $\Omega_N$. Equation (1) $\Omega_N$=exp (j (2π/M)*m+ϕ), where M=2, 4, 8, . . . ; ϕ=0, π/2; and m=0, 1, 2, . . . , M−1, in accordance with some embodiments. Random bits (e.g., bit sequences 1010) may select the value of m and/or ϕ. For example, for M=8, $\Omega_N$=1, exp(j*π/4), exp(j*2π/4), −1, exp(j*5π/4), −j, exp(j*π/4).

Figure 14:
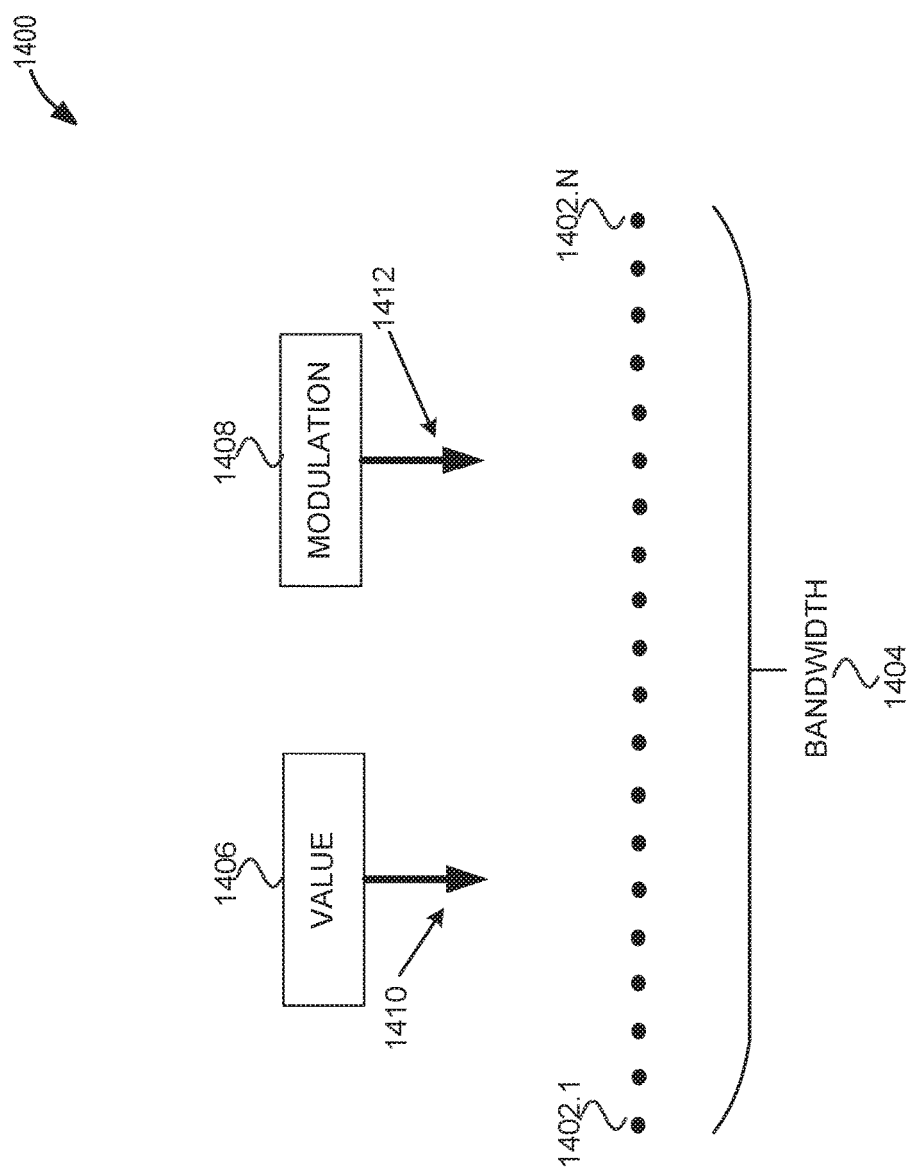
FIG. 14 illustrates mapping a value and modulation to each subcarrier, in accordance with some embodiments.

FIG. 14 illustrates mapping a value and modulation to each subcarrier 1400, in accordance with some embodiments. Illustrated in FIG. 14 is value 1406, modulation 1408, value mapping 1410, modulation mapping 1412, subcarriers 1402.1 through 1402.N, and bandwidth 1404. The bandwidth 1404 may be 20 MHz, 40 MHz, 80 MHz, 80+80 MHz, 160 MHz, 320 MHz, etc. The bandwidth 1404 may be the bandwidth of the transmitted signal, e.g., NDP 800 or HEZ-LTFs 808. The subcarriers 1402 may be the subcarriers 1402 of the bandwidth 1404. Some subcarriers 1402 may be punctured or used for a DC or edge subcarriers 1402. The value 1406 may be values that may be assigned to the subcarriers 1402, e.g. 1, −1, j, −j. In some embodiments, random bits from bit sequences 1010 may be assigned to the subcarriers 1402. In some embodiments, random bits may be assigned to the subcarriers 1402 based on the bit sequences 1010, e.g., bit sequences 1010 may be used to select the bit values to use such as −j or j. Value mapping 1410 indicates that a value is mapped to each of the subcarriers 1402 that is not punctured. Modulation 1408 may be QPSK, 8PSK, 16 QAM, BPSK, and/or QBPSK (or another modulation). In some embodiments, modulation mapping 1412 may map half of the subcarriers 1402 with BPSK and the other half of the subcarriers 1402 with QBPSK. In some embodiments, even subcarriers 1402 may use BPSK with values of 1 and −1 and odd subcarriers 1402 may use QBPSK with j and −j. In another example, the lower subcarriers 1402 may use BPSK and the upper subcarriers 1402 may use QBPSK.

Figure 15:
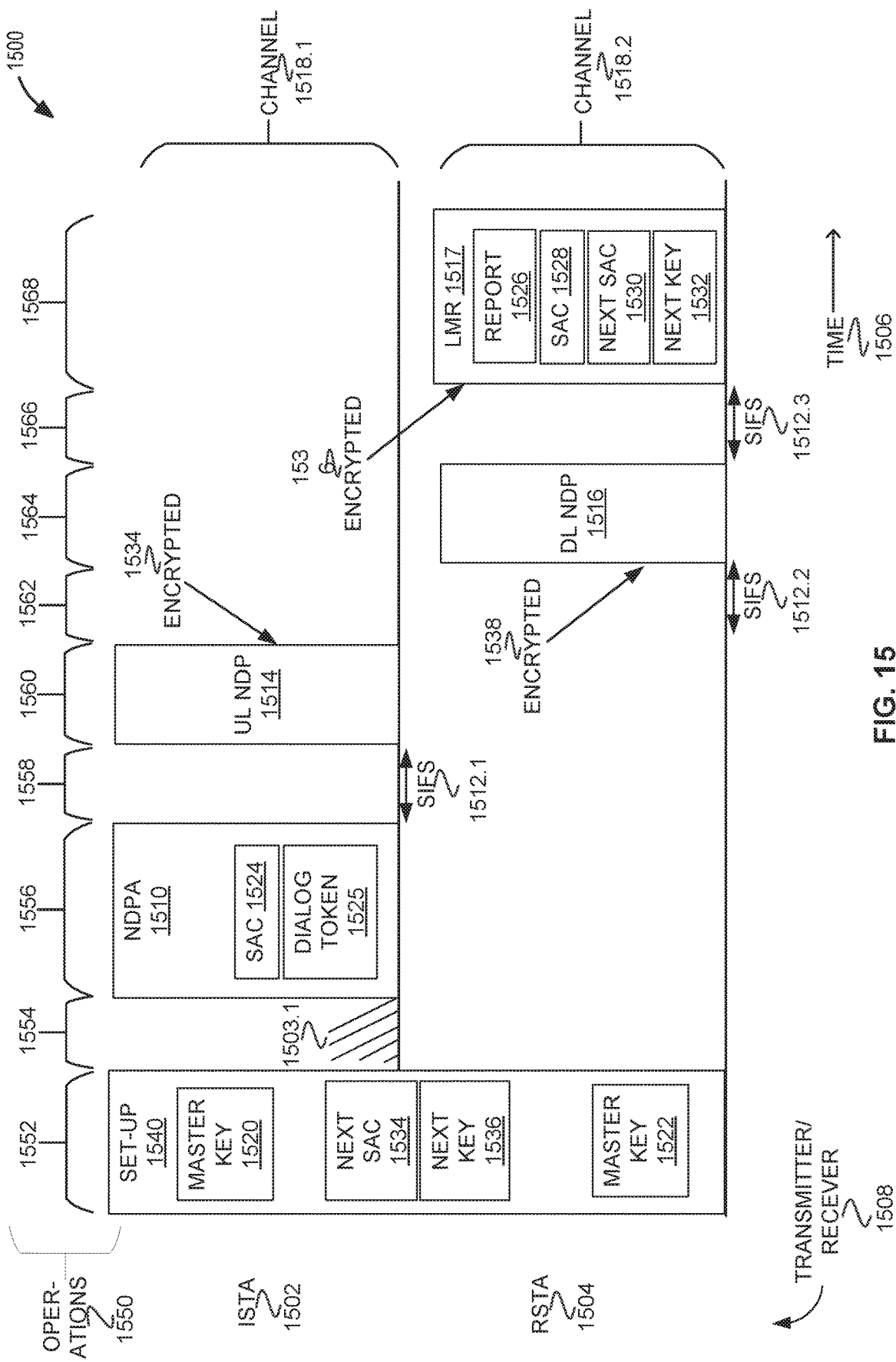
FIG. 15 illustrates a method for protection from counterfeit ranging, in accordance with some embodiments.
Figure 16:
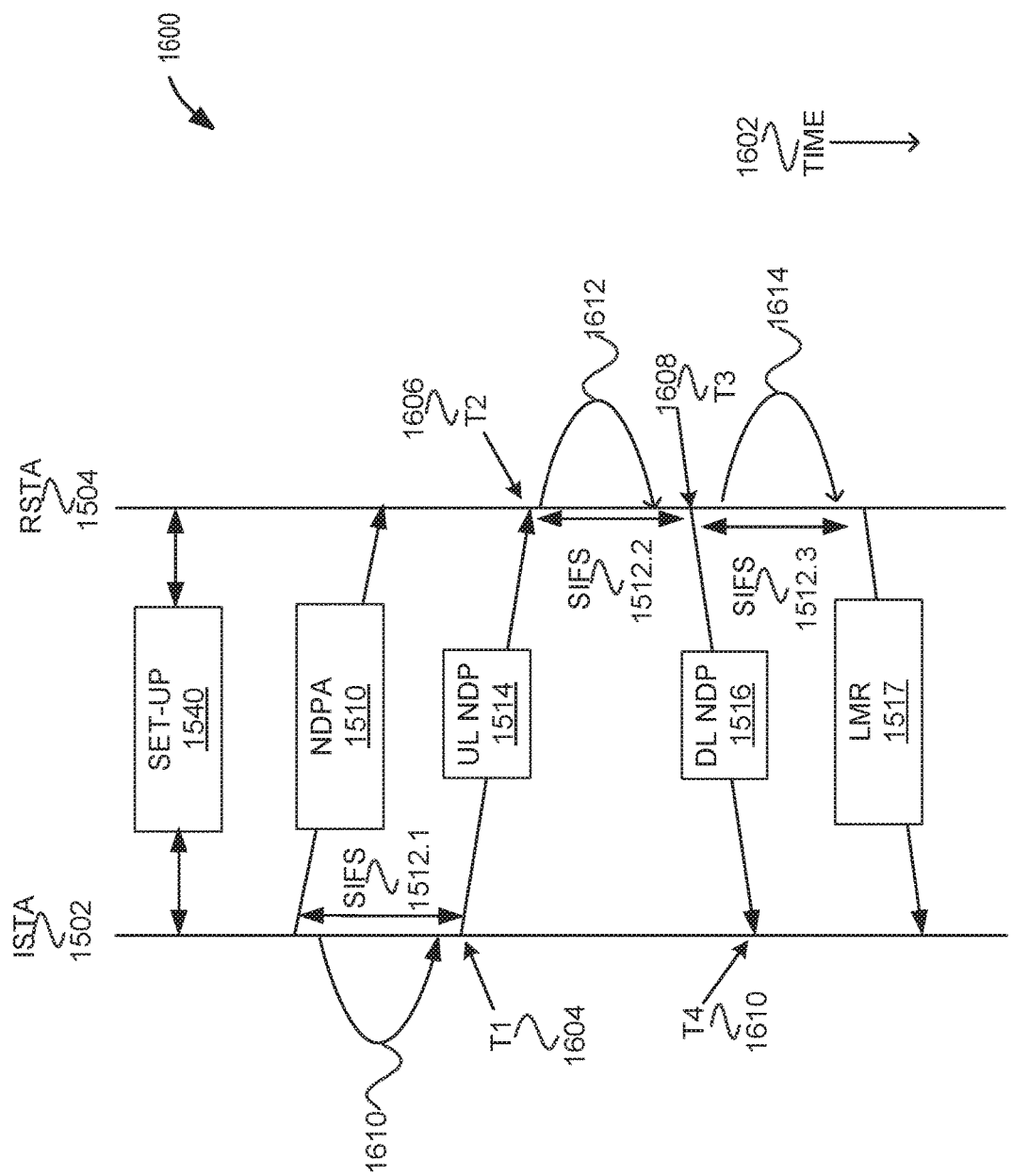
FIG. 16 illustrates the transmitting of set-up and the transmitting of NDPA.

FIGS. 15 and 16 are disclosed in conjunction with one another. FIG. 15 illustrates a method 1500 for protection from counterfeit ranging, in accordance with some embodiments. FIG. 15 illustrates a method 1500 for protection from counterfeit ranging, in accordance with some embodiments. Illustrated in FIG. 15 is time 1506 along a horizontal axis, transmitter/receiver 1508, initiator STA (ISTA) 1502, responder STA (RSTA) 1504, channels 1518, and operations 1550 along the top. Illustrated in FIG. 16 is ISTA 1502, RSTA 1504, and time 1602 along a vertical axis.

The ISTA 1502 may be a HE STA 504 or HE AP 502 as described in conjunction with FIG. 5, e.g., ISTA and RSTA may be configured to operate in accordance with IEEE 802.11 az. Channel 1518.1 and channel 1518.2 may be a sub-band, e.g., 20 MHz, of a bandwidth, e.g., 320 MHz, and may be a number of tones or subcarriers (e.g., 1402). Channel 1518.1 and channel 1518.2 may be the same channel or a different channel. Channel 1518.1 and channel 1518.2 may partially overlap.

The method 1500 begins at operation 1552 with set-up 1540. ISTA 1502 and RSTA 1504 may perform operations for fine time measurements (FTM). The set-up 1540 may be a FTM negotiation. The ISTA 1502 and RSTA 1504 may derive a master key 1520 for the ISTA 1502 and a master key 1522 for the RSTA 1504. In some embodiments, the master key 1520 and master key 1522 are the same. The set-up 1540 may include a pairwise transient key security association (PTKSA), which may be the result of 4-way handshake, FT 4-way handshake, fast basic service set (BSS) transition (FT) protocol, or FT resource request protocol, FILS authentication, pre-association security negotiation (PASN) authentication, or anther protocol. The master key 1520 and 1522 may be derived from the PTKSA. The master keys 1520, 1522 may have a limited lifetime. The master keys 1520, 1522 may be Pairwise Transient Keys (PTK) and/or Pairwise Master Keys (PMKs). In some embodiments, the master keys 1520, 1522 may be Group Transient Keys (GTKs). In some embodiments, the master keys 1520, 1522 may be more than one key each.

In some embodiments, the set-up 1540 may include the exchange of secure LTF parameters element (not illustrated). The method 1500 may continue at operation 1554 with the ISTA 1502 contending for the wireless medium 1503.1, e.g., channel 1518.1. The method 1500 continues at operation 1556 with ISTA 802 transmitting a NDP announcement (NDPA) frame 1510. A duration field of the NDPA frame 1510 may indicate a TXOP duration that may include to the end of the transmission of LMR 1517 (or beyond to an optional LMR transmitted to the RSTA 1504). The NDPA 1510 frame may include a SAC field 1524 and dialog token 1525. The SAC field 1524 may be termed a sounding dialogue token number, in accordance with some embodiments. The SAC field 1524 may be a number that indicates a temporary key or cipher (e.g., SAC field 1524 may be the same or similar as SAC 1006 and may indicate temp key 1004) that will be used to generate bit sequences 1010. The dialog token field 1525 (e.g., dialog token 1003) may indicate a number of a FTM count field, which may be used by generate randomized bit sequence 1008 or may be used to authenticate the FTM round. The NDPA frame 1510 may be addressed to RSTA 1504, e.g., a receiver address (RA) field may include a media access control (MAC) address that addresses RSTA 1504 and/or a STA Info field may include an AID field that addresses RSTA 1504. The NDPA frame 1510 may address other RSTAs 1504 (not illustrated). In some embodiments, the NDPA 1510 may indicate whether the FTM is to be a secure, e.g., that the HEZ-LTFs 808 are to be encrypted or generated by a cipher.

FIG. 16 at 1600 illustrates the transmitting of set-up 1540 and the transmitting of NDPA 1510. The method 1500 continues at operation 1558 with waiting a short interframe space (SIFS) 1512.1. FIG. 16 illustrates ISTA 1502 waiting SFS 1512.1. The method 1500 continues at operation 1560 with transmitting uplink (UL) NDP 1514, e.g., NDP 800 with the HEZ-LTF 808 generated based on bit sequences 1010. The method 1500 may continue at operation 1558 with ISTA 1502 waiting SIFS 1512.1 before transmitting. The method 1500 may continue at operation 1560 with ISTA 1502 transmitting UL NDP 1514, which may be encrypted 1534, e.g., generated based on FIG. 15 and the accompanying disclosure. At operation 1610, ISTA 1502 may encrypt or generate UL NDP 1514. For example, UL NDP 1514 may be a NDP 800. ISTA 1502 may generate randomized bit sequences 1010 and generate the HEZ-LTFs 808 as described herein, e.g. as described in conjunction with FIG. 15.

The method 1500 continues at operation 1562 with RSTA 1504 waiting a SIFS 1512.2. The method 1500 continues at operation 1564 with the RSTA 1504 optionally transmitting DL NDP 1516. The RSTA 1504 may authenticate or verify at operation 1612 that the UL NDP 1514 was generated with next key 1536, which may be identified by next SAC 1534. For example, RSTA 1504 may generate HEZ-LTFs 808 based on bit sequences 1010 and compare the generated HEZ-LTFs 808 with received UL NDP 1514.

The RSTA 1504 may determine whether UL NDP 1514 is authentic or counterfeit. RSTA 1504 may determine whether UL NDP 1514 is authentic or not because a counterfeit or rogue ISTA 1502 may send rouge NDPAs 1510 and/or UL NDPs 1514 and use the DL NDP 1516 return to try and determine the master key 1522 and/or next key 1536. The RSTA 1504 may if it is determined that UL NDP 1514 is counterfeit, not transmit DL NDP 1516, transmit a fake DL NDP 1516 (i.e., with the wrong keys), not transmit LMR 1517, and/or transmit LMR 1517 with an indication in the report 1526 that there was an error indication, which may include an indication that the UL NDP 1514 may be counterfeit and/or wrong keys have been used to generate the UL NDP 1514, or another problem has occurred.

The RSTA 1504 may generate and transmit the DL NDP 1516. For example, the RSTA 1504 may use master key 1522, dialog token 1525, and/or next key 1536 to generate randomized bit sequences 1010 that may be used to generate DL NDP 1516 (e.g., HEZ-LTFs 808).

The method 1500 may continue at operation 1566 with the RSTA 1504 waiting a SIFS 1512.3 before transmitting the LMR 1517. The RSTA 1504 at operation 1614 (e.g., during the SIFS 1512.3) may prepare LMR 1517. The LMR 1517 may include a report 1526, which include times T2 1606 and T3 1608. ISTA 1502 will then have T1 1604, T2 1606, T3 1608, and T4 1610. ISTA 1502 may then determine a Round Trip Time (RTT) in accordance with: RTT=[(T4−T1)−(T3−T2)]. The RTT may be used to determine a distance between RSTA 1504 and ISTA 1502. The LMR 1517 may include a channel state information (CSI) element. In accordance with some embodiments, the ISTA 1502 does not acknowledge the receipt of the LMR 1517.

The report 1526 may include an indication that UL NDP 1514 is likely counterfeit and/or an error indication. The SAC 1528 may identify the temporary key (e.g., next key 1536) that was used to generate DL NDP 1516. The SACs 1534, 1524, and 1528 may be the same and may identify the same key 1536. The next SAC 1530 and next key 1532 may be for a next FTM (dialog token 1525 may be included in LMR 1517). The LMR 1517 may be encrypted using one or more of the master key 1522, next key 1535, and dialog token 1525. Or, the LMR 1517 may be encrypted using one or more master key, temporary key, packet number, or initial vector other than master key 1522, next key 1535, and dialog token 1525. In some embodiments, RSTA 1504 will encrypt LMR 1517 in accordance with Protected Management Frames in accordance with IEEE 802.11w.

The RSTA 1504 will generate next key 1532 and next SAC 1530. In some embodiments, if the UL NDP 1514 was received in error (or determined to be counterfeit) and/or the DL NDP 1516 was transmitted in error, the LMR 1517 may indicate that an error occurred, e.g., by setting a value of the time of arrival (TOA) field to zero, or a value of a TOA Error field to a maximum value, or by setting an indication field in the LMR 1517 to a value indicating the corresponding type of error. In some embodiments, the RSTA 1504 may have transmitted the LMR 1517 because a LMR type of reporting may have been set to immediate, e.g., immediate/delayed which may have been set to immediate during set-up 1540.

In some embodiments, the ISTA 1502 may transmit a LMR (not illustrated) to the RSTA 1504 a SIFS 1512 after receiving the LMR 1517. The ISA 1502 may generate the LMR 1517 to include a report (e.g., times T1 and T4 1610). The LMR from the ISA 1602 may include the SAC 1528 and/or dialog token 1525 as well. The LMR may be encrypted in a same or similar way as LMR 1617.

Figure 17:
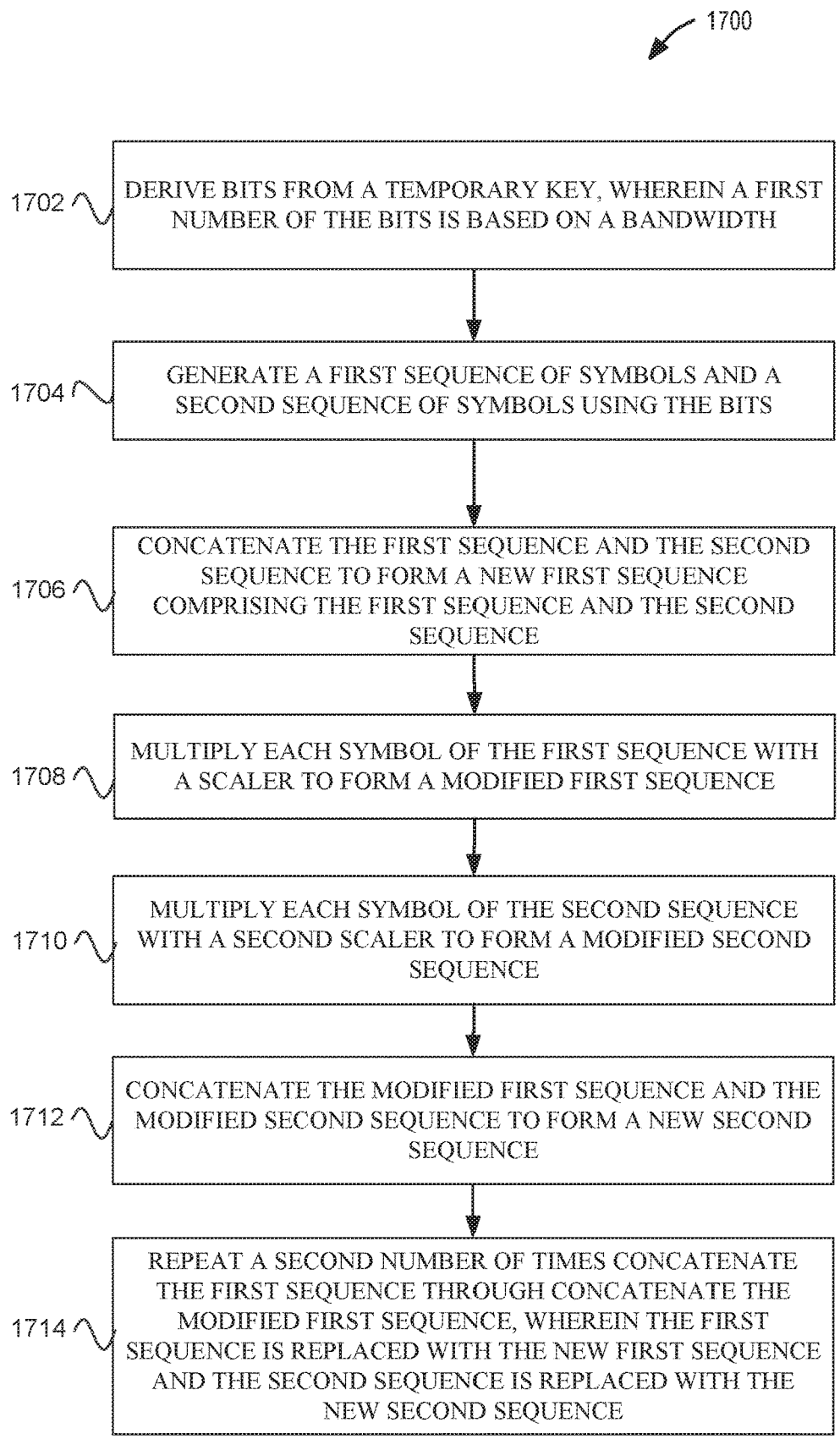
FIG. 17 illustrates a method of secure sounding, in accordance with some embodiments.

FIG. 17 illustrates a method of secure sounding 1700, in accordance with some embodiments. The method 1700 may begin at operation 1702 deriving bits from a temporary key, where a first number of the bits is based on a bandwidth. For example, bit sequences 1010 from temporary key 1004. The method 1700 may continue at operation 1704 with generating a first sequence of symbols and a second sequence of symbols using the bits. For example, RSTA 1504 or ISTA 1502 may create short sequence 1 1302.1 and short sequence 2 1302.2. The first sequence and the second sequence may be symbols which may be numbers, e.g., sequence 916, in accordance with some embodiments. The first sequence and the second sequence may be symbols which may be representations of time-space and frequency-domain signals to be modulated on subcarrier, in accordance with some embodiments.

The method 1700 may continue at operation 1706 with concatenating the first sequence and the second sequence to form a new first sequence comprising the first sequence and the second sequence. For example, RSTA 1504 or ISTA 1502 may concatenate S1 and S2 to form long sequence 1 1304.1. The method 1700 may continue at operation 1708 with multiplying each symbol of the first sequence with a scaler to form a modified first sequence. For example, the RSTA 1504 or ISTA 1502 may multiply each symbol of S1 with Ω 1306. The method 1700 may continue at operation 1710 with multiplying each symbol of the second sequence with a second scaler to form a modified second sequence.

For example, the RSTA 1504 or ISTA 1502 may multiple each symbol of S2 with Ω 1306.

The method 1700 may continue at operation 1712 with concatenating the modified first sequence and the modified second sequence to form a new second sequence. For example, RSTA 1504 or ISTA 1502 may concatenate S1 and S2 to form long sequence 2 1304.2. The method 1700 may continue at operation 1714 with repeating a second number of times the steps of concatenate the first sequence through concatenate the modified first sequence, where the first sequence is replaced with the new first sequence and the second sequence is replaced with the new second sequence. For example, the RSTA 1504 or ISTA 1502 may replace short sequence 1 1302.1 with long sequence 1 1304.1 and short sequence 2 1302.2 with long sequence 2 1304.2, and repeat the method until a desired length of the long sequence 1 1304.1 and long sequence 2 1304.2 is achieved.

The method 1700 may optionally continue with mapping the new first sequence and the new second sequence to a plurality of subcarriers of the bandwidth. For example, the RSTA 1504 or ISTA 1502 may the resultant long sequence 1 1304.1 and long sequence 2 1304.2 to subcarriers of a bandwidth, e.g., subcarriers 1402. In another example, RSTA 1504 or ISTA 1502 may map sequence 916 using subcarrier mapper 908 to derive mapped sequence 918.

The method 1700 may optionally continue with where the second number is based on a number of the plurality of subcarriers. For example, the number of times the method of 1300 will be repeated will depend on the bandwidth and number of subcarriers of the bandwidth, e.g., subcarriers is 256 for a 80 MHz bandwidth, 126 for a 40 MHz bandwidth, 64 for a 20 MHz.

The method 1700 may optionally continue with apply a time-domain cyclic shift to the plurality of subcarriers. Cyclic shifter 912 may apply a cyclic shift to mapped sequence 918 at CSD 910 to derive shifted sequence 918. The time-domain cyclic shift may be determined based on second bits 914.

Figure 18:
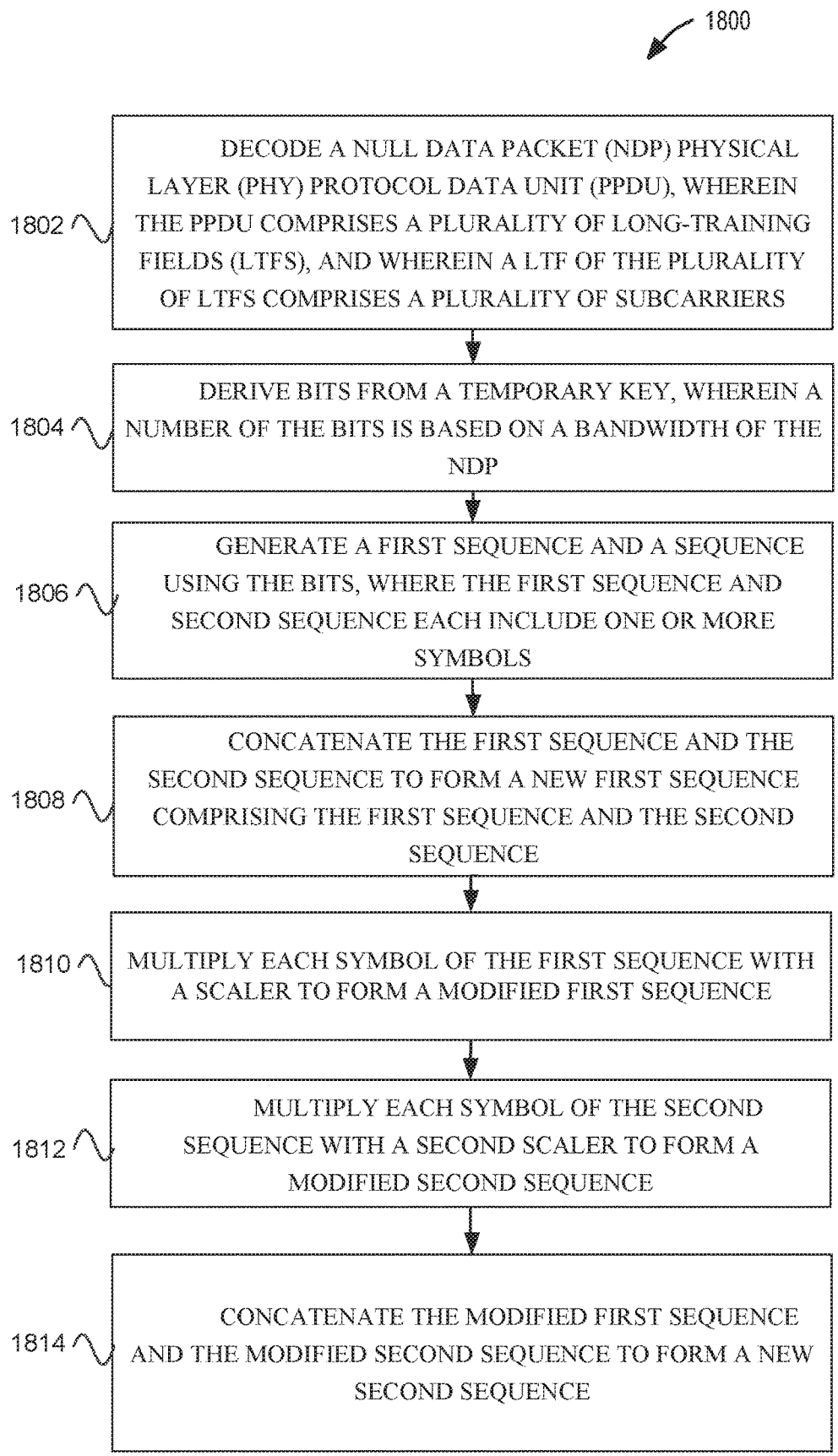
FIG. 18 illustrates a method of secure sounding 1800, in accordance with some embodiments.

FIG. 18 illustrates a method of secure sounding 1800, in accordance with some embodiments. The method 1800 may begin at operation 1802 with decoding a NDP PPDU, where the PPDU includes a plurality of LTFs, and where a LTF of the plurality of LTFs comprises a plurality of subcarriers. For example, ISTA 1502 or RSTA 1504 may decode DL NDP 1516 or UL NDP 1514, respectively, which may include HEz-LTFs 808.

The method 1800 may continue at operation 1804 with deriving bits from a temporary key, wherein a number of the bits is based on a bandwidth of the NDP. For example, generate randomized bit sequence 1008 may be used for a bandwidth of the NDP. In another example, random number generator 904 may be used where the input to random number generator 902 includes the bandwidth of the NDP.

The method 1800 may continue at operation 1806 with generating a first sequence and a second sequence using the bits, where the first sequence and second sequence comprise one or more symbols. For example, sequence generator 906 may be used to generate sequence 916, which may include generating short sequence 1 1302.1 and short sequence 2 1302.2.

The method 1800 may continue at operation 1808 with concatenating the first sequence and the second sequence to form a new first sequence comprising the first sequence and the second sequence. For example, as disclosed in conjunction with FIGS. 9 and 13, long sequence 1 1304.1 or long sequence 2 1304.2 may be formed by concatenating short sequence 1 1302.1 and short sequence 2 1302.2.

The method 1800 may continue at operation 1810 with multiplying each symbol of the first sequence with a scaler to form a modified first sequence. For example, as disclosed in conjunction with FIGS. 9 and 13, long sequence 2 1302.2 (or long sequence 1 1304.1) may be multiplied by Ω 1306.

The method 1800 may continue at operation 1812 with multiplying each symbol of the second sequence with a second scaler to form a modified second sequence. For example, as disclosed in conjunction with FIGS. 9 and 13, long sequence 2 1302.2 (or long sequence 1 1304.1) may be multiplied by Ω 1306.

The method 1800 may continue at operation 1814 with concatenating the modified first sequence and the modified second sequence to form a new second sequence. For example, long sequence 1 1304.1 or long sequence 2 1304.2 may be formed from short sequence 1 1302.1 and short sequence 2 1302.2 where short sequence 1 1302.1 and/or short sequence 2 1302.2 may be multiplied by a scalar.

The method 1800 may continue with (not illustrated) repeating a number of times the steps of concatenate the first sequence through concatenate the modified first sequence, where the first sequence is replaced with the new first sequence and the second sequence is replaced with the new second sequence. For example, as disclosed in conjunction with FIGS. 9 and 13, the operations may be repeated to form resultant sequence 1306 and/or sequence 916.

The method 1800 may continue with (not illustrated) determining the NDP is authenticate if the plurality of subcarriers were transmitted based on the first new sequence and the second new sequence. For example, RSTA 1504 may determine if UL NDP 1514 is consistent or authenticated based on channel estimates that are based on measured signals from the HEz-LTF of the UL NDP 1514 and the first new sequence and the second new sequence, which indicate what should have been transmitted by the ISTA 1502 for the HEz-LTFs 808 of the UL NDP 1514. The ISTA 1502 may determine if the DL NDP 1516 is authentic or consistent in a similar or same manner as the RSTA 1504. The RSTA 1504 may indicate in the LMR 1517 if the UL NDP 1514 is determined to be inconsistent or not authenticated.

The following provide further embodiments. Example 1 is an apparatus of a station, the apparatus including memory; and processing circuitry coupled to the memory, the processing circuity configured to: derive bits from a temporary key, where a number of the bits is based on a bandwidth; generate a first sequence of symbols and a second sequence of symbols using the bits; concatenate the first sequence and the second sequence to form a new first sequence of symbols including the first sequence and the second sequence; multiply each symbol of the first sequence with a scaler to form a modified first sequence of symbols; multiply each symbol of the second sequence with a second scaler to form a modified second sequence of symbols; concatenate the modified first sequence and the modified second sequence to form a new second sequence of symbols; and repeat a number of times the concatenate the first sequence through concatenate the modified first sequence, where the first sequence is replaced with the new first sequence and the second sequence is replaced with the new second sequence.

In Example 2, the subject matter of Example 1 includes, where the processing circuitry is further configured to: map symbols of the new first sequence and the new second sequence to a plurality of subcarriers of the bandwidth.

In Example 3, the subject matter of Example 2 includes, where the processing circuitry is further configured to: configure the station to transmit a null data packet (NDP) physical layer (PHY) protocol data unit (PPDU), where the PPDU includes a plurality of long-training fields (LTFs), and where a LTF of the plurality of LTFs includes the symbols of the new first sequence and the new second sequence modulated on the plurality of subcarriers.

In Example 4, the subject matter of Example 3 includes, where the processing circuitry is further configured to: determine new first sequences and new second sequences for each LTF of each of the plurality of LTFs.

In Example 5, the subject matter of Example 4 includes, where the processing circuitry is further configured to: map new first sequences and new second sequences to the plurality of subcarriers for each of the plurality of LTFs, where each LTF of the plurality of LTFs includes the symbols of a corresponding new first sequence and a corresponding new second sequence modulated on the plurality of subcarriers.

In Example 6, the subject matter of Examples 2-5 includes, where the number of times is based on a number of the plurality of subcarriers. In Example 7, the subject matter of Example 6 includes, where the number of the plurality of subcarriers is 512 for an 80 MHz bandwidth, 256 for a 40 MHz bandwidth, 128 for a 20 MHz.

In Example 8, the subject matter of Examples 2-7 includes, where each symbol of the new first sequence and each symbol of the new second sequence is mapped to one of the subcarriers of the plurality of subcarriers.

In Example 9, the subject matter of Examples 2-8 includes, where the processing circuitry is further configured to: determine a time-domain cyclic shift based on the bits; and apply a linear phase shift that is equivalent to the time-domain cyclic shift to a signal generated to modulate symbols of the new first sequence and the new second sequence on the plurality of subcarriers.

In Example 10, the subject matter of Examples 2-9 includes, where the processing circuitry is further configured to: determine a time-domain cyclic shift based on the bits; and apply the time-domain cyclic shift to a time domain signal generated to modulate symbols of the new first sequence and the new second sequence on the plurality of subcarriers.

In Example 11, the subject matter of Examples 2-10 includes, where the bandwidth includes the plurality of subcarriers and one or both of: DC subcarriers and a plurality of edge subcarriers, and where each symbol of the symbols is mapped to one subcarrier of the plurality of subcarriers.

In Example 12, the subject matter of Examples 1-11 includes, where the processing circuitry is further configured to: map each symbol of the new first sequence and the new second sequence to a subcarrier of a plurality of subcarriers of the bandwidth to modulate each subcarrier of the plurality of subcarriers in accordance with eight phase shift keying. In Example 13, the subject matter of Examples 1-12 includes, transceiver circuitry coupled to the processing circuitry; and one or more antennas coupled to the transceiver circuitry.

Example 14 is a non-transitory computer-readable storage medium that stores instructions for execution by one or more processors of an apparatus of a station, the instructions to configure the one or more processors to: derive bits from a temporary key, where a number of the bits is based on a bandwidth; generate a first sequence of symbols and a second sequence of symbols using the bits; concatenate the first sequence and the second sequence to form a new first sequence of symbols including the first sequence and the second sequence; multiply each symbol of the first sequence with a scaler to form a modified first sequence of symbols; multiply each symbol of the second sequence with a second scaler to form a modified second sequence of symbols; concatenate the modified first sequence and the modified second sequence to form a new second sequence of symbols; and repeat a number of times the concatenate the first sequence through concatenate the modified first sequence, where the first sequence is replaced with the new first sequence and the second sequence is replaced with the new second sequence.

In Example 15, the subject matter of Example 14 includes, where determine channel estimates for the channel further includes: mapping the new first sequence and the new second sequence to a plurality of subcarriers of the bandwidth. In Example 16, the subject matter of Examples 14-15 includes, where each symbol of the new first sequence and each symbol of the new second sequence is mapped to one of the subcarriers of the plurality of subcarriers.

Example 17 is an apparatus of a station, the apparatus including memory; and processing circuitry coupled to the memory, the processing circuity configured to: decode a null data packet (NDP) physical layer (PHY) protocol data unit (PPDU), where the PPDU includes a plurality of long-training fields (LTFs), and where a LTF of the plurality of LTFs includes a plurality of subcarriers; derive bits from a temporary key, where a number of the bits is based on a bandwidth of the NDP; generate a first sequence and a second sequence using the bits, where the first sequence and second sequence comprise each comprise one or more symbols; concatenate the first sequence and the second sequence to form a new first sequence including the first sequence and the second sequence; multiply each symbol of the first sequence with a scaler to form a modified first sequence; multiply each symbol of the second sequence with a second scaler to form a modified second sequence; concatenate the modified first sequence and the modified second sequence to form a new second sequence; repeat a number of times the concatenate the first sequence through concatenate the modified first sequence, where the first sequence is replaced with the new first sequence and the second sequence is replaced with the new second sequence; and determine the NDP is authenticate if the plurality of subcarriers were transmitted based on the first new sequence and the second new sequence.

In Example 18, the subject matter of Example 17 includes, where the processing circuitry is further configured to: before the determine, apply a time-domain cyclic shift to the time domain signal generated by the plurality of subcarriers or apply alinear phase shift to the plurality of subcarriers.

In Example 19, the subject matter of Example 18 includes, where the processing circuitry is further configured to: determine the time-domain cyclic shift based on the bits. In Example 20, the subject matter of Examples 17-19 includes, where station is a responder station (RSTA) or an initiator station (ISTA), and where the station is configured to operate in accordance with one or more of the following communication standards: an Institute of Electrical and Electronic Engineers (IEEE) 802.11ax, an IEEE 802.11 extremely-high throughput (EHT), IEEE 802.11az, and IEEE 802.11.

Example 21 is a method performed by an apparatus of a station, the method including: deriving bits from a temporary key, where a number of the bits is based on a bandwidth; generating a first sequence of symbols and a second sequence of symbols using the bits; concatenating the first sequence and the second sequence to form a new first sequence of symbols including the first sequence and the second sequence; multiplying each symbol of the first sequence with a scaler to form a modified first sequence of symbols; multiplying each symbol of the second sequence with a second scaler to form a modified second sequence of symbols; concatenating the modified first sequence and the modified second sequence to form a new second sequence of symbols; and repeating a number of times the concatenate the first sequence through concatenate the modified first sequence, where the first sequence is replaced with the new first sequence and the second sequence is replaced with the new second sequence.

In Example 22, the subject matter of Example 21 includes, the method further including: mapping symbols of the new first sequence and the new second sequence to a plurality of subcarriers of the bandwidth.

In Example 23, the subject matter of Example 22 includes, the method further including: configuring the station to transmit a null data packet (NDP) physical layer (PHY) protocol data unit (PPDU), where the PPDU includes a plurality of long-training fields (LTFs), and where a LTF of the plurality of LTFs includes the symbols of the new first sequence and the new second sequence modulated on the plurality of subcarriers.

In Example 24, the subject matter of Example 23 includes, the method further including: determining new first sequences and new second sequences for each LTF of each of the plurality of LTFs.

In Example 25, the subject matter of Example 24 includes, the method further including: mapping new first sequences and new second sequences to the plurality of subcarriers for each of the plurality of LTFs, where each LTF of the plurality of LTFs includes the symbols of a corresponding new first sequence and a corresponding new second sequence modulated on the plurality of subcarriers.

In Example 26, the subject matter of Examples 22-25 includes, where the number of times is based on a number of the plurality of subcarriers. In Example 27, the subject matter of Example 26 includes, where the number of the plurality of subcarriers is 512 for an 80 MHz bandwidth, 256 for a 40 MHz bandwidth, 128 for a 20 MHz.

In Example 28, the subject matter of Examples 22-27 includes, where each symbol of the new first sequence and each symbol of the new second sequence is mapped to one of the subcarriers of the plurality of subcarriers. In Example 29, the subject matter of Examples 22-28 includes, the method further including: determining a time-domain cyclic shift based on the bits; and applying a linear phase shift that is equivalent to the time-domain cyclic shift to a signal generated to modulate symbols of the new first sequence and the new second sequence on the plurality of subcarriers.

In Example 30, the subject matter of Examples 22-29 includes, the method further including: determining a time-domain cyclic shift based on the bits; and apply the time-domain cyclic shift to a time domain signal generated to modulate symbols of the new first sequence and the new second sequence on the plurality of subcarriers.

In Example 31, the subject matter of Example 22 includes, where the bandwidth includes the plurality of subcarriers and one or both of: DC subcarriers and a plurality of edge subcarriers, and where each symbol of the symbols is mapped to one subcarrier of the plurality of subcarriers.

In Example 32, the subject matter of Example 31 includes, the method further including: mapping each symbol of the new first sequence and the new second sequence to a subcarrier of a plurality of subcarriers of the bandwidth to modulate each subcarrier of the plurality of subcarriers in accordance with eight phase shift keying.

Example 33 is an apparatus of a station, the apparatus including: means for deriving bits from a temporary key, where a number of the bits is based on a bandwidth; means for generating a first sequence of symbols and a second sequence of symbols using the bits; means for concatenating the first sequence and the second sequence to form a new first sequence of symbols including the first sequence and the second sequence; means for multiplying each symbol of the first sequence with a scaler to form a modified first sequence of symbols; means for multiplying each symbol of the second sequence with a second scaler to form a modified second sequence of symbols; means for concatenating the modified first sequence and the modified second sequence to form a new second sequence of symbols; and means for repeating a number of times the concatenate the first sequence through concatenate the modified first sequence, where the first sequence is replaced with the new first sequence and the second sequence is replaced with the new second sequence.

In Example 34, the subject matter of Example 33 includes, the apparatus further including: means for mapping symbols of the new first sequence and the new second sequence to a plurality of subcarriers of the bandwidth.

In Example 35, the subject matter of Example 34 includes, the apparatus further including: means for configuring the station to transmit a null data packet (NDP) physical layer (PHY) protocol data unit (PPDU), where the PPDU includes a plurality of long-training fields (LTFs), and where a LTF of the plurality of LTFs includes the symbols of the new first sequence and the new second sequence modulated on the plurality of subcarriers.

In Example 36, the subject matter of Example 35 includes, the apparatus further including: means for determining new first sequences and new second sequences for each LTF of each of the plurality of LTFs.

In Example 37, the subject matter of Example 36 includes, the apparatus further including: means for mapping new first sequences and new second sequences to the plurality of subcarriers for each of the plurality of LTFs, where each LTF of the plurality of LTFs includes the symbols of a corresponding new first sequence and a corresponding new second sequence modulated on the plurality of subcarriers.

In Example 38, the subject matter of Examples 34-37 includes, where the number of times is based on a number of the plurality of subcarriers. In Example 39, the subject matter of Example 38 includes, MHz. In Example 40, the subject matter of Examples 34-39 includes, where each symbol of the new first sequence and each symbol of the new second sequence is mapped to one of the subcarriers of the plurality of subcarriers. In Example 41, the subject matter of Examples 34-40 includes, the apparatus further including: means for determining a time-domain cyclic shift based on the bits; and means for applying a linear phase shift that is equivalent to the time-domain cyclic shift to a signal generated to modulate symbols of the new first sequence and the new second sequence on the plurality of subcarriers.

In Example 42, the subject matter of Examples 34-41 includes, the apparatus further including: means for determining a time-domain cyclic shift based on the bits; and apply the time-domain cyclic shift to a time domain signal generated to modulate symbols of the new first sequence and the new second sequence on the plurality of subcarriers.

In Example 43, the subject matter of Examples 34-42 includes, where the bandwidth includes the plurality of subcarriers and one or both of: DC subcarriers and a plurality of edge subcarriers, and where each symbol of the symbols is mapped to one subcarrier of the plurality of subcarriers.

In Example 44, the subject matter of Examples 33-43 includes, the apparatus further including: means for mapping each symbol of the new first sequence and the new second sequence to a subcarrier of a plurality of subcarriers of the bandwidth to modulate each subcarrier of the plurality of subcarriers in accordance with eight phase shift keying.

Example 45 is a non-transitory computer-readable storage medium that stores instructions for execution by one or more processors of an apparatus of a station, the instructions to configure the one or more processors to: decode a null data packet (NDP) physical layer (PHY) protocol data unit (PPDU), where the PPDU includes a plurality of long-training fields (LTFs), and where a LTF of the plurality of LTFs includes a plurality of subcarriers; derive bits from a temporary key, where a number of the bits is based on a bandwidth of the NDP; generate a first sequence and a second sequence using the bits, where the first sequence and second sequence comprise each comprise one or more symbols; concatenate the first sequence and the second sequence to form a new first sequence including the first sequence and the second sequence; multiply each symbol of the first sequence with a scaler to form a modified first sequence; multiply each symbol of the second sequence with a second scaler to form a modified second sequence; concatenate the modified first sequence and the modified second sequence to form a new second sequence; repeat a number of times the concatenate the first sequence through concatenate the modified first sequence, where the first sequence is replaced with the new first sequence and the second sequence is replaced with the new second sequence; and determine the NDP is authenticate if the plurality of subcarriers were transmitted based on the first new sequence and the second new sequence.

In Example 46, the subject matter of Example 45 includes, where the instructions further configure the one or more processors to: before the determine, apply a time-domain cyclic shift to the time domain signal generated by the plurality of subcarriers or apply a linear phase shift to the plurality of subcarriers. In Example 47, the subject matter of Examples 45-46 includes, where the instructions further configure the one or more processors to: determine the time-domain cyclic shift based on the bits.

Example 48 is a method performed by an apparatus of a station, the method including: decoding a null data packet (NDP) physical layer (PHY) protocol data unit (PPDU), where the PPDU includes a plurality of long-training fields (LTFs), and where a LTF of the plurality of LTFs includes a plurality of subcarriers; deriving bits from a temporary key, where a number of the bits is based on a bandwidth of the NDP; generating a first sequence and a second sequence using the bits, where the first sequence and second sequence comprise each comprise one or more symbols; concatenating the first sequence and the second sequence to form a new first sequence including the first sequence and the second sequence; multiplying each symbol of the first sequence with a scaler to form a modified first sequence, multiplying each symbol of the second sequence with a second scaler to form a modified second sequence; concatenating the modified first sequence and the modified second sequence to form a new second sequence; repeating a number of times the of concatenate the first sequence through concatenate the modified first sequence, where the first sequence is replaced with the new first sequence and the second sequence is replaced with the new second sequence; and determine the NDP is authenticate if the plurality of subcarriers were transmitted based on the first new sequence and the second new sequence.

In Example 49, the subject matter of Example 48 includes, the method further including: before the determine, applying a time-domain cyclic shift to the time domain signal generated by the plurality of subcarriers or apply a linear phase shift to the plurality of subcarriers.

In Example 50, the subject matter of Examples 48-49 includes, where the instructions further configure the one or more processors to: determining the time-domain cyclic shift based on the bits.

Example 51 is an apparatus of a station, the apparatus including: means for decoding a null data packet (NDP) physical layer (PHY) protocol data unit (PPDU), where the PPDU includes a plurality of long-training fields (LTFs), and where a LTF of the plurality of LTFs includes a plurality of subcarriers; means for deriving bits from a temporary key, where a number of the bits is based on a bandwidth of the NDP; means for generating a first sequence and a second sequence using the bits, where the first sequence and second sequence comprise each comprise one or more symbols; means for concatenating the first sequence and the second sequence to form a new first sequence including the first sequence and the second sequence; means for multiplying each symbol of the first sequence with a scaler to form a modified first sequence; means for multiplying each symbol of the second sequence with a second scaler to form a modified second sequence; means for concatenating the modified first sequence and the modified second sequence to form a new second sequence; means for repeating a number of times the of concatenate the first sequence through concatenate the modified first sequence, where the first sequence is replaced with the new first sequence and the second sequence is replaced with the new second sequence; and determine the NDP is authenticate if the plurality of subcarriers were transmitted based on the first new sequence and the second new sequence.

In Example 52, the subject matter of Example 51 includes, the apparatus further including: before the determine, means for applying a time-domain cyclic shift to the time domain signal generated by the plurality of subcarriers or apply a linear phase shift to the plurality of subcarriers.

In Example 53, the subject matter of Examples 51-52 includes, the apparatus further including: means for determining the time-domain cyclic shift based on the bits. Example 54 is at least one machine-readable medium including instructions that, when executed by processing circuitry, cause the processing circuitry to perform operations to implement of any of Examples 1-53.

Example 55 is an apparatus including means to implement of any of Examples 1-53. Example 56 is a system to implement of any of Examples 1-53. Example 57 is a method to implement of any of Examples 1-53.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a wireless device, the apparatus comprising: memory; processing circuitry coupled to the memory; and transceiver circuitry coupled to the processing circuitry, the processing circuitry configured to:

derive a number of bits, wherein the number of bits is based on a bandwidth of a null data packet (NDP) physical layer (PHY) protocol data unit (PPDU) to transmit;
generate two initial 8 phase shift keying (PSK) symbols $s_1^{(0)}$ and $s_2^{(0)}$ based on the number of bits;
generate a sequence of $2^P$ 8PSK symbols by performing P-1 iterations, wherein for p-th iteration two sequences $s_1^{(p)}$ and $s_2^{(p)}$ are generated by concatenating two sequences from the (p-1) iteration $s_1^{(p-1)}$ and $s_2^{(p-1)}$ wherein $s_1^{(p)}$ is equal to $s_1^{(p-1)}$ concatenated with $s_2^{(p-1)}$ and wherein $s_2^{(p)}$ is equal to a scaler times $s_1^{(p-1)}$ concatenated with negative a value of the scaler times and $s_2^{(p-1)}$, wherein a value of P is based on the bandwidth of the NDP PPDU to transmit;
encode the NDP PPDU to comprise the $2^P$ 8PSK symbols as secure long training fields; and
configure the transceiver circuitry to transmit a signal comprising the NDP PPDU.

2. The apparatus of claim 1, wherein the encode the NDP PPDU to comprise the $2^P$ 8PSK symbols as secure long training fields, further comprises:
map $s_1^{(p-1)}$ and $s_2^{(p-1)}$ on non-zero subcarriers comprising the secure long training fields of the NDP PPDU.

3. The apparatus of claim 2, wherein the processing circuitry is further configured to:
apply a time-domain cyclic shift to each of the non-zero sub-carriers.

4. The apparatus of claim 3, wherein the processing circuitry is further configured to:
determine the time-domain cyclic shift based on the number of bits.

5. The apparatus of claim 1, wherein the processing circuitry is further configured to:
determine the value of the scaler based on a value of exponential of (j*π/4*a constant), wherein the constant is determined from the number of bits and j is the square root of −1.

6. The apparatus of claim 1, wherein the bandwidth is 20, 40, 80, or 160/80+80 M1 Hz.

7. The apparatus of claim 1, wherein the processing circuitry is further configured to:
encode a ranging element, the ranging element comprising an indication that secure LTFs are to be used; and
configure the wireless device to transmit the ranging element to a responder station (RSTA).

8. The apparatus of claim 1, wherein the number of bits is based on a logarithm to the base 2 of the $2^P$ 8PSK symbols times a first constant plus a second constant.

9. The apparatus of claim 1, wherein the processing circuitry is further configured to:
determine a time-domain cyclic shift based on the number of bits; and
apply a linear phase shift that is equivalent to the time-domain cyclic shift to a signal generated to modulate the symbols of the $2^P$ 8PSK symbols during the transmission of the NDP PPDU.

10. The apparatus of claim 1, wherein the encode the NDP PPDU to comprise the $2^P$ 8PSK symbols as the secure long training fields, further comprises:
map $s_1^{(p-1)}$ and $s_2^{(p-1)}$ on the non-zero subcarriers comprising the secure long training fields of the NDP PPDU, wherein a number of the non-zero subcarriers is 512 for an 80 MHz bandwidth, 256 for a 40 MHz bandwidth, and 128 for a 20 MHz.

11. The apparatus of claim 1, wherein the bandwidth comprises subcarriers, DC subcarriers, and edge subcarriers, and wherein each symbol of the $2^P$ 8PSK symbols is mapped to one subcarrier of the subcarriers.

12. The apparatus of claim 1, wherein the derive the number of bits, further comprises:
determine the number of bits based on a shared master key and a temporary key.

13. The apparatus of claim 1, wherein the wireless device is one from the following group: an Institute of Electrical and Electronic Engineers (IEEE) 802.11ax access point, an IEEE 802.11ax station, an IEEE 802.11 extremely high throughput (EHT) station, an IEEE 802.11EIT access point, IEEE 802.1laz responder station (RSTA), and an IEEE 802.11az initiator station (ISTA), an IEEE 802.11 station, and an IEEE 802.11 access point.

14. The apparatus of claim 1, further comprising a direct conversion mixer, the direct conversion mixer configured to directly downconvert RF signals to baseband signals, wherein the processing circuitry is configured to decode the baseband signals, the baseband signals including another NDP PPDU.

15. The apparatus of claim 1, wherein the transceiver circuitry coupled to two or more microstrip antennas for transmitting signalling in accordance with a multiple-input multiple-output (MIMO) technique.

16. A non-transitory computer-readable storage medium that stores instructions for execution by one or more processors of an apparatus of a station, the instructions to configure the one or more processors to:
derive a number of bits, wherein the number of bits is based on a bandwidth of a null data packet (NDP) physical layer (PHY) protocol data unit (PPDU) to transmit;
generate two initial 8PSK symbols $s_1^{(0)}$ and $s_2^{(0)}$ based on the number of bits;
generate a sequence of 2p 8PSK symbols by performing P-1 iterations, wherein for a p-th iteration two sequences $s_1^{(p)}$ and $s_2^{(p)}$ are generated by concatenating two sequences from the (p-1) iteration $s_1^{(p-1)}$ and $s_2^{(p-1)}$ wherein $s_1^{(p)}$ is equal to $s_1^{(p-1)}$ concatenated with $s_2^{(p-1)}$, and wherein $s_2^{(p)}$ is equal to a scaler times $s_1^{(p-1)}$ concatenated with negative a value of the scaler times $s_2^{(p-1)}$, wherein a number of iterations is based on the bandwidth of the NDP PPDU to transmit;
encode the NDP PPDU to comprise the $2^P$ 8PSK symbols as long training fields; and
configure the wireless device to transmit a signal comprising the NDP PPDU.

17. The apparatus of claim 16, wherein the encode the NDP PPDU to comprise the $2^P$ 8PSK symbols as long training fields, further comprises:
map $s_1^{(p-1)}$ and $s_2^{(p-1)}$ on non-zero subcarriers comprising the secure long training fields of the NDP PPDU.

18. An apparatus of a responder station (RSTA), the apparatus comprising: memory; and
processing circuitry coupled to the memory, the processing circuitry configured to:
decode an uplink (UL) null data packet (NDP) physical layer (PHY) protocol data unit (PPDU) within a bandwidth;
derive a number of bits, wherein the number of bits is based on the bandwidth;
generate two initial 8PSK symbols $s_1^{(0)}$ and $s_2^{(0)}$ based on the number of bits;
generate a sequence of $2^P$ 8PSK symbols by performing P-1 iterations, wherein for a p-th iteration two sequences $s_1^{(p)}$ and $s_2^{(p)}$ are generated by concatenating two sequences from the (p-1) iteration $s_1^{(p-1)}$ and $s_2^{(p-1)}$, wherein $s_1^{(p)}$ is equal to $s_2^{(p-1)}$ concatenated with $s_2^{(p-1)}$, and wherein $s_2^{(p)}$ is equal to a scaler times $s_1^{(p-1)}$ concatenated with negative a value of the scaler times $s_2^{(p-1)}$, wherein a number of iterations is based on the bandwidth of the UL NDP PPDU;

determine whether the UL NDP PPDU matches the $2^p$ 8PSK symbols as long training fields;

in response a determination that the UL NDP PPDU matches the $2^p$ 8PSK symbols as long training fields, encode a location measurement report (LMR), the LMR indicating the UL NDP PPDU matches the $2^p$ 8PSK symbols as long training fields; and configure the RSTA to transmit the LMR.

19. The apparatus of claim 18, wherein the determine whether the UL NDP PPDU matches the $2^p$ 8PSK symbols as long training fields, further comprises:

map $s_1^{(p-1)}$ and $s_1^{(p-1)}$ on non-zero subcarriers comprising the secure long training fields of the UL NDP PPDU.

20. The apparatus of claim 18, further comprising a direct conversion mixer, the direct conversion mixer configured to directly downconvert RF signals to baseband signals, wherein the processing circuitry is configured to decode the baseband signals, the baseband signals including the UL NDP PPDU.

* * * * *